US009018115B2

(12) United States Patent
Yasumori et al.

(10) Patent No.: US 9,018,115 B2
(45) Date of Patent: Apr. 28, 2015

(54) LIGHT-EMITTING GLASS, LIGHT-EMITTING DEVICE EQUIPPED WITH THE LIGHT-EMITTING GLASS, AND PROCESS FOR PRODUCING LIGHT-EMITTING GLASS

(75) Inventors: Atsuo Yasumori, Tokyo (JP); Tetsuo Kishi, Tokyo (JP); Naoko Matsui, Izumisano (JP)

(73) Assignee: Tokyo University of Science Educational Foundation Administrative Organization, Tokyo (JP)

( * ) Notice: Subject to any disclaimer, the term of this patent is extended or adjusted under 35 U.S.C. 154(b) by 396 days.

(21) Appl. No.: 13/504,344

(22) PCT Filed: Oct. 22, 2010

(86) PCT No.: PCT/JP2010/068755
§ 371 (c)(1),
(2), (4) Date: Apr. 26, 2012

(87) PCT Pub. No.: WO2011/052514
PCT Pub. Date: May 5, 2011

(65) Prior Publication Data
US 2012/0212962 A1  Aug. 23, 2012

(30) Foreign Application Priority Data

Oct. 27, 2009 (JP) .................................. 2009-247121

(51) Int. Cl.
*C03C 4/12* (2006.01)
*C03C 3/089* (2006.01)
*C03C 14/00* (2006.01)

(52) U.S. Cl.
CPC . *C03C 3/089* (2013.01); *C03C 4/12* (2013.01); *C03C 14/004* (2013.01); *C03C 2214/08* (2013.01)

(58) Field of Classification Search
CPC .......... C03C 3/062; C03C 3/089; C03C 4/12; C03C 14/004; C03C 2214/08
USPC ........................................ 501/13, 32, 65, 72
See application file for complete search history.

(56) References Cited

U.S. PATENT DOCUMENTS 3,795,523 A * 3/1974 Moriya et al. ................... 501/13
4,075,024 A * 2/1978 Armistead ....................... 501/58
4,076,544 A * 2/1978 Kerko et al. ..................... 501/13
4,125,405 A * 11/1978 Araujo et al. ................... 501/13
4,337,295 A * 6/1982 Rittler ............................ 428/410
5,281,562 A * 1/1994 Araujo et al. ................... 501/32
6,221,480 B1 * 4/2001 Borrelli et al. ................ 428/325
6,536,236 B2 * 3/2003 Grossman et al. .......... 65/30.11
6,979,661 B1 * 12/2005 Borrelli et al. ................. 501/10
7,758,774 B2 * 7/2010 Chen et al. ............. 252/301.4 F
8,309,974 B2 * 11/2012 Nakayama et al. ............ 257/81
2006/0122050 A1 * 6/2006 Borrelli et al. ................. 501/56
2009/0237787 A1 * 9/2009 Yoneda et al. ................ 359/492
2011/0001159 A1 * 1/2011 Nakamura et al. .............. 257/98

FOREIGN PATENT DOCUMENTS

| CN | 101108769 A | 1/2008 |
| JP | 10-036835 | 2/1998 |
| JP | 10-236843 A | 9/1998 |
| JP | 2007-112975 A | 5/2007 |
| WO | WO 2009116531 A1 * | 9/2009 |
| WO | WO 2009128354 A1 * | 10/2009 |

OTHER PUBLICATIONS

Atsuo Yasumori, "Eu-dope $Na_2O$-$B_2O_3$-$Sio_2$-kei Bunso Glass no Hakko Kyodo", The Ceramic Society of Japan Kanto Branch Kenkyu Happyokai Koen Yoshishu, $22^{nd}$, 2006, p. 55.
E. Vernaz, "Fracture Toughness-Composition Relationship in Some Binary and Ternary Glass Systems", Journal of Non-Crystalline Solids, 1980, vol. 37, p. 359-365.
Piyi Du. "Kinetics of Phase Separation of Soda-Lime-Silica Glass with Minor P205 Additions", Journal of Non-Crystalline Solids, 1989, vol. 112, p. 251-257.
Office Action dated Feb. 17, 2014 in counterpart Chinese Patent Application No. 201080048306.4.

* cited by examiner

*Primary Examiner* — Anthony J Green
*Assistant Examiner* — Elizabeth A Bolden
(74) *Attorney, Agent, or Firm* — Novak Druce Connolly Bove + Quigg LLP

(57) ABSTRACT

Provided is a light-emitting glass which is applicable to, e.g., white illuminators including a light-emitting diode as a light source, and which emits light of a warm white color when irradiated with near ultraviolet light and combines long-term weatherability with high heat resistance; a light-emitting device containing same and a process for producing same. The light-emitting glass includes, as the base glass, borosilicate or silicate glass having a separated-phase structure, whereby the base glass is efficiently doped with, for example, transition metal ion clusters which emit light of a warm white color upon irradiation with near ultraviolet light. With this glass, it is possible to attain increases in excitation wavelength and emission wavelength. The glass thus emits, based on a multiple scattering effect, high-intensity light of a warm white color upon irradiation with near ultraviolet light.

16 Claims, 26 Drawing Sheets

FIG. 4
EXAMPLE 1-A
UNDER WHITE LIGHT 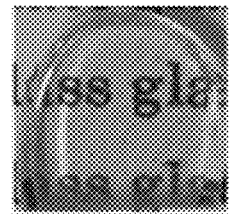
UNDER 254nm 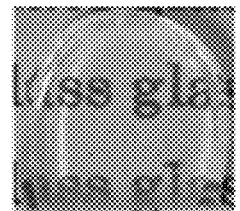
UNDER 365nm 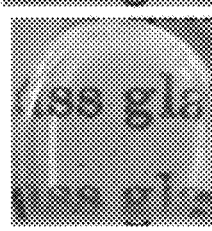

LIGHT-EMITTING GLASS, LIGHT-EMITTING DEVICE EQUIPPED WITH THE LIGHT-EMITTING GLASS, AND PROCESS FOR PRODUCING LIGHT-EMITTING GLASS

CROSS REFERENCE TO RELATED APPLICATIONS

This application is a National Phase filing under 35 U.S.C. §371 of PCT/JP2010/068755 filed on Oct. 22, 2010; and this application claims priority to Application No. 2009-247121 filed in Japan on Oct. 27, 2009 under 35 U.S.C. §119; the entire contents of all are hereby incorporated by reference.

TECHNICAL FIELD

The present invention relates to a light-emitting glass, a light-emitting device equipped with the light-emitting glass, and a process for producing the light-emitting glass. More specifically, the present invention relates to a light-emitting glass which emits light of a warm white color (yellow to orange) when irradiated with near-ultraviolet light, a light-emitting device equipped with the light-emitting glass, and a process for producing the light-emitting glass.

BACKGROUND ART

In recent years, fluorescent materials for light-emitting devices used for flat panel displays, high-intensity and low-power consumption lighting, etc. have gained much attention. In regard to such fluorescent materials, development of fluorescent materials or light-emitting materials with less environmental load and free from rare raw materials other than fluorescent lamps using mercury or fluorescent materials containing much rare earths has been required in view of global environmental problems. Furthermore, since high color rendering properties are needed for illumination light sources, the illumination light sources have also been required to have a broad spectrum within a desired wavelength region (color gamut) in a visible light range of about 400 nm to 800 nm in wavelength. In this kind of environment, white light-emitting diodes (LED) or light-emitting devices equipped with them have been attracting attention as new illumination light sources in place of fluorescent lamps or incandescent lamps. Illumination using a light source of white light-emitting diodes closer to practical use provides advantages of high luminance efficiency and longer operating life; therefore, such illumination light sources are expected to be promising in the future.

There are the following configurations in the white light-emitting diodes: (a) purple to blue light-emitting diodes plus yellow light-emitting phosphor fine particles, (b) ultraviolet light-emitting diodes plus various phosphor fine particles of RGB light-emitting type, and (c) RGB three-color light-emitting diodes; among these, the configuration (a) has become mainstream and is exemplified by a combination of a blue light-emitting diode and a YAG:Ce fluorescence substance, in which cerium (Ce) of an activator is introduced into yttrium aluminate ($Y_3Al_5O_{12}$:YAG) of a base material of fluorescence substance to thereby exhibit blue color rendering (e.g., see Patent Document 1). Furthermore, a glass matrix, into which a transition metal ion has been introduced, causes light absorption in a visible light region or fluorescent emission in a near-infrared region and thus can be used as a fluorescent substance through the use of a high intensity emission. There has been provided a glass material containing a monovalent copper ion ($Cu^+$ ion) and exhibiting blue fluorescence as such a fluorescent substance (e.g., see Patent Document 2).

Patent Document 1: Japanese Unexamined Patent Application, Publication No. H10-36835
Patent Document 2: Japanese Unexamined Patent Application, Publication No. H10-236843

DISCLOSURE OF THE INVENTION

Problems to be Solved by the Invention

As explained above, there has been a problem that current white light-emitting diodes exhibit blue color rendering, however, provide a cool feeling in emission color due to stronger blue and weaker red since the color rendering range required of light-emitting diodes for general lighting is warm (yellow to orange). There has also been a problem that high-power light-emitting diodes are necessary for increasing illumination intensity, however, the high-power light-emitting diodes lead to higher heat generation and thus resins or fluorescent materials themselves degrade due to high temperatures resulting from the heat generation.

The present invention has been made in view of the problems described above; and it is an object of the present invention to provide a light-emitting glass which is applicable to white illuminators including a light-emitting diode as a light source, emits light of a warm white color when irradiated with near ultraviolet light, and combines long-term weatherability with high heat resistance; a light-emitting device equipped with the light-emitting glass, and a process for producing the light-emitting glass.

Means for Solving the Problems

In order to solve the problems described above, in a first aspect of the present invention, there is provided a light-emitting glass which includes a borosilicate glass having a separated-phase structure composed of at least one of (i) to (iii) below as a base glass, in which the base glass includes a transition metal ion cluster and/or transition metal cluster containing at least one selected from the group consisting of copper (Cu), gold (Au), and silver (Ag) as a constituent metal;
(i) alkaline metal borosilicate glass having a separated-phase structure ($R_2O$—$B_2O_3$—$SiO_2$),
(ii) alkaline earth metal borosilicate glass having a separated-phase structure (R'O—$B_2O_3$—$SiO_2$), and
(iii) alkaline metal-alkali earth metal borosilicate glass having a separated-phase structure ($R_2O$—R'O—$B_2O_3$—$SiO_2$);
in (i) to (iii), R represents an alkali metal and R' represents an alkaline earth metal, respectively.

In a second aspect of the present invention, there is provided a light-emitting glass which includes a silicate glass having a separated-phase structure composed of at least one of (iv) to (vi) below as a base glass, in which the base glass includes a transition metal ion cluster and/or transition metal cluster containing at least one selected from the group consisting of copper (Cu), gold (Au), and silver (Ag) as a constituent metal;
(iv) alkaline metal silicate glass having a separated-phase structure ($R_2O$—$SiO_2$),
(v) alkaline earth metal silicate glass having a separated-phase structure (R'O—$SiO_2$), and
(vi) alkaline metal-alkali earth metal silicate glass having a separated-phase structure ($R_2O$—R'O—$SiO_2$);
in (iv) to (vi), R represents an alkali metal and R' represents an alkaline earth metal, respectively.

According to a third aspect of the present invention, in the light-emitting glass described above, the transition metal ion cluster is a copper ion cluster (Cu$^+$ cluster), and the base glass is an alkali metal borosilicate glass having a separated-phase structure ($R_2O$—$B_2O_3$—$SiO_2$).

According to a fourth aspect of the present invention, in the light-emitting glass described above, the alkali metal of the alkali metal borosilicate glass is sodium (Na).

In a fifth aspect of the present invention, there is provided a light-emitting device which includes the light-emitting glass of the present invention described above and a light-emitting element as a light-emitting source.

According to a sixth aspect of the present invention, in the light-emitting device of the present invention described above, the light-emitting element is a light-emitting diode.

In a seventh aspect of the present invention, there is provided a process for producing the light-emitting glass according to the first aspect, in which a raw material component containing a compound which corresponds to a borosilicate glass having a separated-phase structure composed of at least one of (i) to (iii) for forming a base glass and a compound containing a transition metal which corresponds to the transition metal ion cluster and/or transition metal cluster are dry-mixed, melted, and quenched.

In an eighth aspect of the present invention, there is provided a process for producing the light-emitting glass according to the second aspect, in which a raw material component containing a compound which corresponds to a silicate glass having a separated-phase structure composed of at least one of (iv) to (vi) for forming a base glass and a compound containing a transition metal which corresponds to the transition metal ion cluster and/or transition metal cluster are dry-mixed, melted, and quenched.

According to a ninth aspect of the present invention, in the process for producing the light-emitting glass described above, tin oxide (SnO) is further included as a reducing agent.

According to a tenth aspect of the present invention, in the process for producing the light-emitting glass described above, an additive amount of the tin oxide (SnO) is 0.1 to 10.0 mol % as outer percentage.

Effects of the Invention

The light-emitting glass of the present invention includes the borosilicate or silicate glass having a separated-phase structure as a base glass, whereby the base glass is efficiently doped with, for example, the transition metal ion cluster or transition metal cluster which emits light of a warm white color (yellow to orange) when irradiated with near-ultraviolet light, thus achieving to increase excitation wavelength and emission wavelength and resulting in a fluorescent material which emits high-intensity light of a warm white color (yellow to orange) upon irradiation with near ultraviolet light due to a multiple scattering effect. Furthermore, since the borosilicate or silicate glass, which is a common glass material, is included as the constituent material, it is possible to inexpensively provide a fluorescent material combining long-term weatherability with respect to ultraviolet rays, etc. with resistance to high temperatures.

The light-emitting device of the present invention is equipped with the light-emitting glass of the present invention and a light-emitting element as a light-emitting source; therefore, the light-emitting device emits high-intensity light of a warm white color (yellow to orange) and is excellent in weatherability and heat resistance and thus may comply with saving of energy in place of incandescent lights or fluorescent lamps and saving of rare resources.

In the process for producing the light-emitting glass of the present invention, a raw material component containing a compound which corresponds to a borosilicate glass or silicate glass for forming a base glass and a compound containing a transition metal which corresponds to the transition metal ion cluster etc. is dry-mixed and vitrified by melting and quenching, therefore, the light-emitting glass capable of exerting the effects described above can be simply produced.

BRIEF DESCRIPTION OF THE DRAWINGS

FIG. 4 is a view showing appearance photographs of glass samples which are irradiated with white light or ultraviolet light having a central wavelength of 254 nm or 365 nm in Evaluation (1);

EXPLANATION OF REFERENCE NUMERALS

Figure 1:
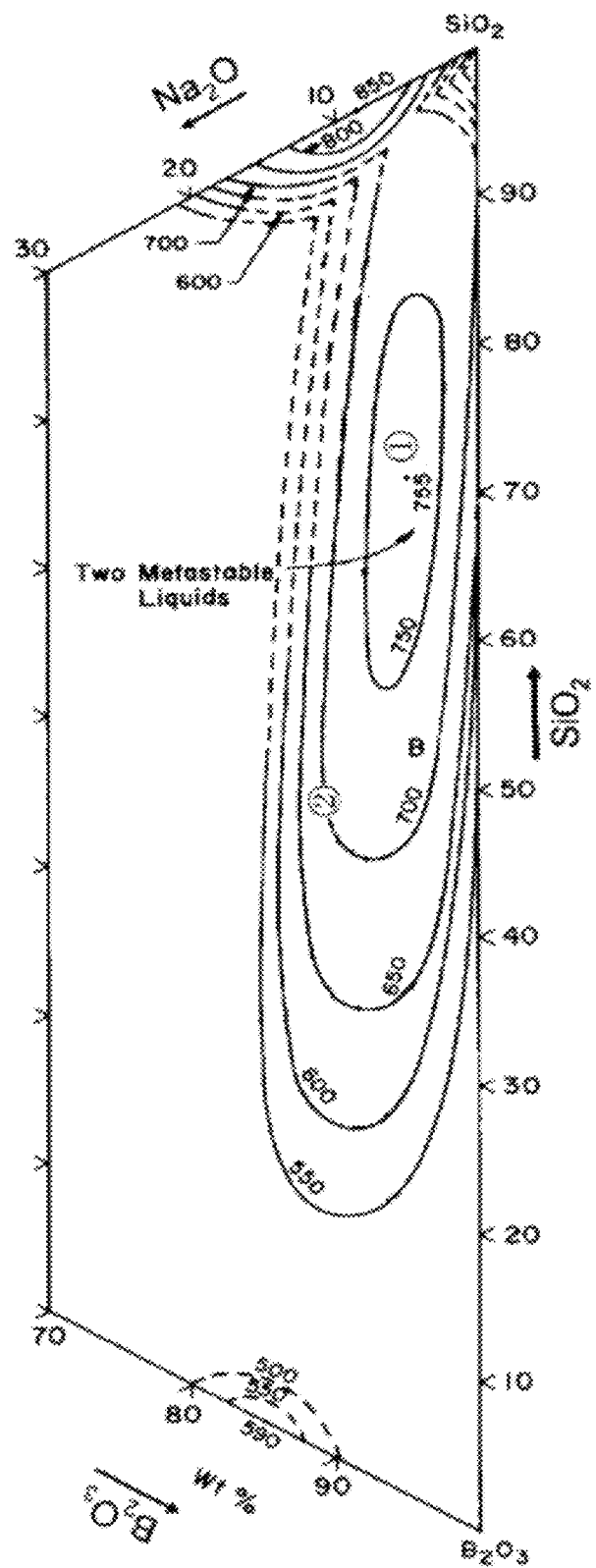
FIG. 1 is a phase diagram of NBS ($Na_2O$—$B_2O_3$—$SiO_2$) system.

1: light-emitting device
11: light-emitting glass
12: light-emitting element
14: submount element

PREFERRED MODE FOR CARRYING OUT THE INVENTION

Hereinafter, an embodiment of the present invention is explained. The essential constitution of the light-emitting glass of the present invention is that the borosilicate glass or silicate glass having a separated-phase structure is a base glass and the base glass contains a transition metal ion cluster and/or transition metal cluster.

(1) Transition Metal Cluster and/or Transition Metal Ion Cluster:

In the light-emitting glass of the present invention, the base glass described later contains a transition metal ion cluster or transition metal cluster. The metal or metal ion of the transition metal ion cluster or transition metal cluster (hereinafter, sometimes referred to as "transition metal ion cluster, etc.") is exemplified by copper (Cu), gold (Au), and silver (Ag) which are supposed to emit light in a glass; and at least one of them may be used. Among these, copper (Cu) is preferably used since it is relatively inexpensive and the cluster thereof stably produces yellow to orange emission.

In addition, the above-mentioned transition metal ion cluster or transition metal cluster is exemplified by copper cluster (Cu cluster), copper ion cluster ($Cu^+$ cluster), gold cluster (Au cluster), gold ion cluster ($Au^{n+}$ cluster; n: an integer of 1 to 6), silver cluster (Ag cluster), silver ion cluster ($Ag^+$ cluster), etc.

The term "transition metal ion cluster" or "transition metal cluster" in the present invention means an aggregation of transition metal atoms or transition metal ions, and the transition metal ion cluster or transition metal cluster is incorporated into a glass material of base body (base glass in the present invention) to form an emission center and exhibits yellow emission as an activator. In the case of copper ion cluster ($Cu^+$ cluster), for example, yellow to orange emission is exhibited at around 580 nm under excitation by ultraviolet light at a long wavelength around 350 nm (e.g., 365 nm).

(2) Base Glass:

It is necessary that the base glass of the light-emitting glass of the present invention is a glass material having a separated-phase structure; specifically, usable glass materials may be exemplified by alkali metal borosilicate glass having a separated-phase structure ($R_2O$—$B_2O_3$—$SiO_2$), alkaline earth metal borosilicate glass having a separated-phase structure (R'O—$B_2O_3$—$SiO_2$), alkali metal alkaline earth metal borosilicate glass having a separated-phase structure ($R_2O$—R'O—$B_2O_3$—$SiO_2$), alkali metal silicate glass having a separated-phase structure ($R_2O$—$SiO_2$), alkaline earth metal silicate glass having a separated-phase structure (R'O-$SiO_2$), and alkali metal alkaline earth metal silicate glass having a separated-phase structure ($R_2O$—R'O—$SiO_2$). These borosilicate glasses or silicate glasses are materials having long-term weatherability to ultraviolet rays, etc. as well as high heat resistance, thus may be used without problems even in cases where high-power light-emitting diodes are light sources thereof.

In the base glass, R is an alkali metal and preferably Li, Na, or K in particular. R' is an alkaline earth metal and preferably Ca, Mg, Sr, or Ba in particular. R or R' may be selected as one kind of metal (element) or a combination of alkali metals (e.g., Na—K), alkaline earth metals (e.g., Ca—Mg), or an alkali metal and an alkaline earth metal (e.g., Na—Ca), respectively. Additionally, when copper ion cluster ($Cu^+$ cluster) is used as the transition metal ion cluster, the base glass is preferably the alkali metal borosilicate glass having a separated-phase structure ($R_2O$—$B_2O_3$—$SiO_2$) by reason of higher efficiency of yellow to orange emission, etc., and particularly preferably the borosilicate glass ($Na_2O$—$B_2O_3$—$SiO_2$) in which alkali metal of the alkali metal borosilicate glass is sodium (Na).

Here, the glass material having a separated-phase structure indicates a glass which is formed of a separated-phase texture or composed of an immiscible-region texture; for example, there exists an immiscible region which separates into two phases at a liquidus temperature or lower in many compositional systems containing silica or boric acid among oxide glass systems. There exists a uniform liquid phase at certain high temperatures in such systems, therefore, an apparently uniform glass may be obtained if quench is performed at the temperatures. However, the glass is potentially likely to be immiscible and thus generates phase separation when maintained at a temperature where diffusion migration of substances is possible; therefore, the phase separation is referred to as metastable-immiscibility, and when the glass is heat-treated under the metastable-immiscibility at certain composition and temperature within a nucleation-growth mechanism region, a droplet-state separated-phase structure (separated-phase texture) is formed and a three-dimensionally intertwined separated-phase texture is also formed at a spinodal decomposition region.

Furthermore, in regards to silicate or borate systems, two-phase separation often occurs at a temperature region from a liquidus to higher temperatures, i.e. under a high-temperature melt state. Such phase separation is referred to as stable-immiscibility, and the phase separation easily progresses under the melt state due to a higher diffusion speed. In the two-component system of R'O—$SiO_2$ (R': alkaline earth metal) which is a representative composition exhibiting the stable-immiscibility, generally, the stable-immiscible region extends over a temperature region from a liquidus near 1700° C. to higher temperatures. As the size of alkaline earth ion becomes larger, the separated-phase range becomes narrower and the temperature region becomes lower; for example, in a case of Ba, the immiscible region corresponds to temperatures lower than the liquidus, i.e. to a metastable state. Additionally, the "glass having a separated-phase structure" in the present invention indicates entirely glass materials where a separated-phase structure can be formed and encompasses glass materials where phase separation is potentially progressing even when the separated-phase structure is not apparently formed yet.

In general, when a metal ion of transition metal ion etc. (or metal of transition metal) is doped in a glass material, metal ion or metal colloid is formed in addition to metal ion cluster or metal cluster; and when a dope amount is excessively increased in order to increase the metal ion cluster etc., metal ion, metal colloid, etc. other than the metal ion cluster, etc. are inevitably formed since the control of metal valence is difficult. On the other hand, when a metal ion or metal is doped in a glass material having a separated-phase structure (borosilicate glass or silicate glass), for example, when a separated-phase glass of silicate system is used, a metal ion (e.g., $Cu^+$ ion) selectively enters into a silica-poor glass phase ($Na_2O$—$B_2O_3$ rich phase in NBS ($Na_2O$—$B_2O_3$—$SiO_2$) system), thus the metal ion (or metal) is more easily collected and condensed into a glass phase than the case of uniform glass; therefore, no more than a small additive amount of the metal is necessary for forming the metal ion cluster or metal cluster, thereby resulting in easy control of metal valence corresponding to the cluster and also prevention of agglomeration of metal itself; consequently, the metal ion cluster ($Cu^+$ cluster in a case of copper) can be effectively formed and the light-emitting glass, which emits light of a warm white color (yellow to orange) when irradiated with near-ultraviolet light, can be simply obtained. In addition, by way of doping a transition metal ion cluster, etc. into the glass material having a separated-phase structure as a fluorescent activator, a glass material can be prepared that emits highly bright light due to multiple scattering at interfaces in the separated-phase structure by near-ultraviolet light as excitation light of the fluorescent activator and is highly resistant to ultraviolet rays, electron beam, and chemicals. Additionally, the means of confirming the separated-phase structure in the glass material is exemplified by observation of texture using electron microscopes, small-angle X-ray scattering processes, ultraviolet-visible light scattering processes, etc.

The composition of the glass material having the separated-phase structure can be easily selected based on a phase diagram corresponding to the glass material. FIG. 1 shows a phase diagram of NBS ($Na_2O$—$B_2O_3$—$SiO_2$) system. The phase diagram of NBS system shown by FIG. 1 may also be applied to alkali metal borosilicate glasses using other alkali metals (Li, K).

In addition to the above-mentioned descriptions, with respect to the compositions of alkaline earth metal borosilicate glass having a separated-phase structure, alkali metal-alkaline earth metal borosilicate glass having a separated-phase structure, alkali metal silicate glass having a separated-phase structure, alkaline earth metal silicate glass having a separated-phase structure, and alkali metal alkaline earth metal silicate glass having a separated-phase structure, for example, composition (phase) diagrams of the separated-phase structure of NBS ($Na_2O$—$B_2O_3$—$SiO_2$) system and $R_2O$—$Si_2O$ system (R=Li, Na, K) are described in "Handbook of Glass Engineering" (ed. by M. Yamane et al., Asakura Syoten, 1999, pp. 192), etc. and also selection or analogical selection thereof will be possible from the following descriptions (a) to (f) in "Introduction to Ceramics", 2nd edition, W. D. Kingery, H. K. Bowen, D. R. Uhlmann, John Wiley & Sons, Inc., 1975.

(a) $Na_2B_8O_{13}$—$SiO_2$ system ($Na_2O.4B_2O_3$—$SiO_2$ system) (pp. 113)
(b) RO—$SiO_2$ system (R=Mg, Ca, Sr, Ba, Fe, Zn) (pp. 118)
(c) $R_2O$—$SiO_2$ system (R=Li, Na, K) (pp. 119)
(d) $BaO$—$Al_2O_3$—$SiO_2$ system (pp. 120)
(e) $Na_2O$—$B_2O_3$—$SiO_2$ system (pp. 121)
(f) $Na_2O$—$CaO$—$SiO_2$ system (pp. 122)

The composition range of the separated-phase structure varies with temperature and the range in two-component systems can be indicated from a diagram when a temperature is decided; however, there may be a case in which the range cannot be expressed in a three-component system such as $Na_2O$—$B_2O_2$—$SiO_2$ unless an end component is decided. For example, the above-mentioned (a) is true of the case, that is, when the end component is decided to be $Na_2B_8O_{13}$ and $SiO_2$, the diagram is expressed by the same expression as that of two-component systems; thus the range can be decided from the diagram if the temperature is decided. Other three-component systems can be decided for their ranges by similarly deciding their end components, etc.

If the transition metal ion cluster or transition metal cluster exists in the base glass as much as possible, warm color emission of yellow to orange is likely to generate; therefore, provided that emission of yellow to orange in 550 to 650 nm (e.g. emission center: 580 nm) is within a level capable of visually confirming the emission of yellow to orange under excitation at 350 to 400 nm (e.g. 365 nm), e.g., under excitation by a black light (central wavelength: 365 nm, 4 W), then which demonstrates sufficient existence of the transition metal ion cluster or transition metal cluster.

Additionally, glass network-forming oxides such as $P_2O_5$, tin oxide (SnO) (acting also as a reducing agent during production), intermediate oxides such as $Al_2O_2$, $TiO_2$, ZnO, $ZrO_2$, $Y_2O_3$, PbO, and $V_2O_5$, for example, may be added to the light-emitting glass of the present invention as a third component in addition to the metal cluster or metal ion cluster and the base glass described above. These third components may provide advantages such as control of valence of the transition metal ion or size of the separated-phase structure (separated-phase texture) by forming a glass network (skeleton) or modifying the glass network depending on the composition, etc. These third components may be used alone or in combination of two or more.

(3) Production of Light-Emitting Glass:

The light-emitting glass of the present invention may be simply obtained by mixing, e.g. dry-mixing etc., a raw material component which includes compounds in a predetermined compositional ratio correspondingly to the base glass to form a separated-phase structure; a compound including the transition metal corresponding to the transition metal ion cluster or transition metal cluster, e.g. an oxide including the transition metal (copper oxide (I) ($Cu_2O$) or copper oxide (II) (CuO)), or copper carbonate ($CuCO_3$), copper nitrate (Cu$(NO_3)_2$), copper sulfate ($CuSO_4$), copper chloride (I) (CuCl), copper chloride (II) ($CuCl_2$), etc. in cases where the transition metal is copper, or silver nitrate ($AgNO_3$), silver oxide ($Ag_2O$), etc. in cases where the transition metal is silver; and the third component, etc. as required; and then vitrifying them by conventional glass production processes such as melting and quenching processes (referred also as "glass ceramics process"); specifically, the raw material component is dry-mixed, then the raw material component is heated and melted and then maintained in a molten state, followed by being quenched; and if necessary, post-treatment such as processing into a predetermined shape and polishing such as mirror-surface polishing may be applied.

As the raw material of the base glass, lithium carbonate ($Li_2CO_3$), sodium carbonate ($Na_2CO_3$), or potassium carbonate ($K_2CO_3$), and boric acid ($H_3BO_3$) and silica ($SiO_2$) may be used in a case of alkali metal borosilicate glass ($R_2O$—$B_2O_3$—$SiO_2$), for example; and calcium carbonate ($CaCO_3$), magnesium carbonate ($MgCO_3$), strontium carbonate ($SrCO_3$), or barium carbonate ($BaCO_3$), and boric acid ($H_3BO_3$) and silica ($SiO_2$) may be used in a case of alkali alkaline earth metal borosilicate glass ($R'O$—$B_2O_3$—$SiO_2$), for example. Besides, desired one selected from lithium carbonate ($Li_2CO_3$), sodium carbonate ($Na_2CO_3$), potassium carbonate ($K_2CO_3$), calcium carbonate ($CaCO_3$), magnesium carbonate ($MgCO_3$), strontium carbonate ($SrCO_3$), and barium carbonate ($BaCO_3$), and boric acid ($H_3BO_3$) and silica ($SiO_2$) may be used in a case of alkali metal alkaline earth metal borosilicate glass ($R_2O$—$R'O$—$B_2O_3$—$SiO_2$), for example.

Lithium carbonate ($Li_2CO_3$), sodium carbonate ($Na_2CO_3$), or potassium carbonate ($K_2CO_3$) and silica ($SiO_2$) may be used in a case of alkali metal silicate glass ($R_2O$—$SiO_2$), for example; and calcium carbonate ($CaCO_3$), magnesium carbonate ($MgCO_3$), strontium carbonate ($SrCO_3$), or barium carbonate ($BaCO_3$) and silica ($SiO_2$) may be used in a case of alkali metal silicate glass ($R_2O$—$SiO_2$), for example. Besides, desired one selected from lithium carbonate ($Li_2CO_3$), sodium carbonate ($Na_2CO_3$), potassium carbonate ($K_2CO_3$), calcium carbonate ($CaCO_3$), magnesium carbonate ($MgCO_3$), strontium carbonate ($SrCO_3$), and barium carbonate ($BaCO_3$), and silica ($SiO_2$) may be used in a case of alkali metal alkaline earth metal silicate glass ($R_2O$—$R'O$—$SiO_2$), for example.

Melting temperature (heating temperature) and melting time in the melting and quenching process may be appropriately set depending on the composition of the base glass, etc.; for example, the melting temperature (heating temperature) may be 1200° C. to 1700° C., and the melting time may be 0.5 to 2.0 hours.

The additive amount of the compound including the metal corresponding to the transition metal ion cluster, etc. based on the base glass may be appropriately set depending on the composition of the base glass, species of the transition metal cluster, etc., and is preferably appropriately set depending on the composition of the base glass, etc. within a range of about 0.01 to 2.0 mol % as outer percentage, for example. When the additive amount is insufficient, the necessary amount of the metal ion cluster, etc. may not be formed within the base glass, and when the additive amount is excessive, unnecessary ions, colloids, etc. tend to form, thus the both cases may adversely affect the warm emission. It is particularly preferred that the additive amount of the compound is appropriately set depending on the composition of the base glass, etc. within a range of about 0.1 to 1.0 mol % as outer percentage.

It is also necessary that the reduction condition of the transition metal ion, etc. is maintained in order to keep the valence of the transition metal ion, etc. and effectively form the transition metal ion cluster or transition metal cluster of $Cu^+$ cluster, etc.; and thus a reducing agent is preferably added in order to maintain the reduction condition of the transition metal ion, thereby the control of the reduction condition may be easily performed due to the addition of the reducing agent. Tin oxide (SnO), metal silicon (Si), sugars such as saccharose, starches such as dextrin, carbon powder, for example, may be used as the reducing agent; and tin oxide is preferably used from the viewpoint of ability thereof to selectively enter into a silica-poor glass phase and effectively promote the reduction even in a small amount thereof. Here, tin oxide exerts the function as the reducing agent due to the change from $Sn^{2+}$ to $Sn^{4+}$ in the glass material.

In regards to the additive amount of the reducing agent, when tin oxide is used as the reducing agent, for example, an insufficient amount may make it difficult to properly maintain the reduction condition, on the other hand, excessive addition thereof may adversely affect the structure of the glass or crystallize the glass; therefore, the additive amount may be appropriately set depending on species of the compound used, composition of the base glass, desired emission intensity, etc. within a range of about 0.1 to 10.0 mol % as outer percentage, and the additive amount is preferably 0.5 to 10.0 mol % and more preferably 0.5 to 5.0 by mol %, particularly preferably, is set within a range of 1.0 to 5.0 mol %.

Additionally, a reductive atmosphere may be formed by flowing nitrogen gas or nitrogen-dilution hydrogen gas into heating furnaces such as electric furnaces when forming the molten state, thereby the reduction condition of the metal ion may be maintained after dry-mixing the raw material component. Carbon monoxide (CO) gas may also be used instead of the nitrogen gas or nitrogen-dilution hydrogen for forming the reductive atmosphere.

As described above, the borosilicate glass or silicate glass having a separated-phase structure is used as the base glass in the light-emitting glass of the present invention; therefore, the metal ion cluster or metal cluster emitting light of a warm white color (yellow to orange) when irradiated with near-ultraviolet light is effectively doped in the base glass, and thus light-emitting glass phases, protective glass phases, and their boundaries to be centers of light scatter are complexified in a scale of micro to nano meter, thereby achieving to increase excitation wavelength and emission wavelength and resulting in a fluorescent material which emits high-intensity light of a warm white color (yellow to orange) upon irradiation with near ultraviolet light due to a multiple scattering effect. Furthermore, since the borosilicate or silicate glass, which is a common glass material, is employed as the constituent material, it is possible to inexpensively provide a fluorescent material combining long-term weatherability with respect to ultraviolet rays, etc. with resistance to high temperatures.

As described above, the light-emitting glass of the present invention uses the glass material having a separated-phase structure, then which is doped with the transition metal ion clusters, etc., thereby resulting in the light-emitting glass with high-intensity due to the multiple scattering effect. The reason of increase in the emission intensity due to the multiple scattering effect is that separated-phase textures prone to scatter near-ultraviolet of the excitation wavelength of several ten to several hundred nm can be formed in the glass and irradiated ultraviolet light can be scattered several times by the separated-phase textures to effectively excite metal ion clusters.

The light-emitting glass of the present invention may be combined with a light-emitting element to form a light-emitting source, and then which may be use as a light-emitting device. The light-emitting device emits high-intensity light of a warm white color (yellow to orange) and is excellent in weatherability and heat resistance and thus may comply with saving of energy in place of incandescent lights or fluorescent lamps and saving of rare resources.

The light-emitting element for forming the light-emitting device of the present invention is a photoelectric conversion element to convert electric energy into light; specifically, light-emitting diodes such as ultraviolet-visible light-emitting diodes, laser diodes, surface-emitting laser diodes, inorganic electroluminescence elements, organic electroluminescence elements, etc. may be used for the light-emitting element; in particular, light-emitting diodes such as ultraviolet-visible light-emitting diodes are preferable from the viewpoint of providing semiconductor light-emitting elements with high power. The wavelength emitted by the light-emitting element as the light-emitting source is not particularly limited in principle and of no matter as long as it is within the range of wavelength capable of exciting the light-emitting glass of the present invention; for example, the wavelength may be 330 to 450 nm.

Figure 2:
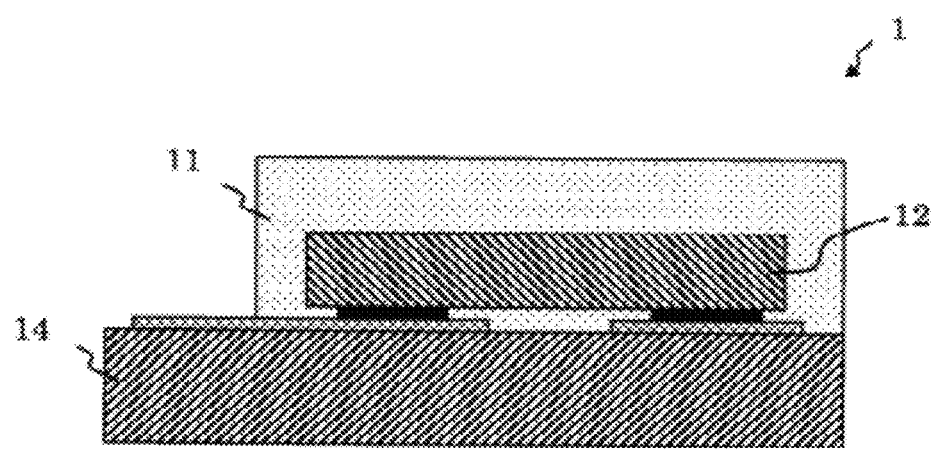
FIG. 2 is a schematic view showing an embodiment of the light-emitting device of the present invention.

The constitution of the light-emitting device of the present invention is not particularly limited as long as the light-emitting glass of the present invention and the light-emitting element are used as a light-emitting source; for example, the light-emitting glass and the light-emitting element are used as a light-emitting source, and the light-emitting glass and the light-emitting element are constructed in combination such that the light-emitting glass covers the light-emitting element. FIG. 2 is a schematic view showing an embodiment of the light-emitting device of the present invention. In the light-emitting device 1 of the present invention shown in FIG. 2, the light-emitting glass 11 of the present invention and the light-emitting element 12 consisting of light-emitting diodes, etc. are used as a light-emitting source, and which is mounted on a submount element 14 while keeping conduction of the light-emitting element 12, thereby constructing the light-emitting device 1 (semiconductor light-emitting element) with sealing the light-emitting element 12 by the package of the light-emitting glass 11 of the present invention.

On the other hand, the embodiment described above is no more than one embodiment of the present invention, thus the present invention is not limited to the embodiment, and it is needless to say that modification or improvement having the constitution of the present invention and within the range capable of achieving the purpose and effect of the present invention is encompassed by the present invention. Besides, specific structure, shape, etc. in carrying out the present invention may be changed uneventfully into other structure, shape, etc. within the range capable of achieving the purpose and effect of the present invention. The present invention is not limited to the illustrative embodiments described above, and modification or improvement within the range capable of achieving the purpose of the present invention is encompassed by the present invention.

For example, the constitution of the light-emitting device 1 of the present invention shown in FIG. 2 is no more than one example, the light-emitting device 1 is not limited to the constitution, and any constitution of the light-emitting source including the light-emitting glass 11 and the light-emitting element 12 may be employed.

For the rest, specific structure, shape, etc. in carrying out the present invention may be changed into other structure, etc. within the range capable of achieving the purpose of the present invention.

EXAMPLES

The present invention is explained more specifically with reference to Examples and Comparative Examples hereinafter; however, the present invention is not limited to Examples, etc. at all.

Examples 1 and 2

Preparation of Light-Emitting Glass Using Alkali Metal Borosilicate Glass

Two compositions, having a basic composition of $Na_2O$—$B_2O_3$—$SiO_2$ (NBS system) and considered to have a separated-phase structure in the phase diagram of FIG. 1, were selected for base glasses (base glass of light-emitting glass in Example 1: 6.6$Na_2O$-28.3$B_2O_3$-65.1$SiO_2$ mol %; base glass of light-emitting glass in Example 2: 11.5$Na_2O$-44.0$B_2O_3$-44.5$SiO_2$ mol %; expressed by encircled numbers 1 and 2 in order in FIG. 1). Additionally, additive amounts of copper oxide ($Cu_2O$) and species and additive amounts of reducing agents are described in Evaluations below, in which the additive amounts are expressed by outer percentage.

An essential production process was such that sodium carbonate ($Na_2CO_3$), boric acid ($H_3BO_3$), and silica ($SiO_2$) were used as raw materials of the base glasses and weighed in a desired mole ratio, then to which copper oxide ($Cu_2O$) and a reducing agent (tin oxide (SnO)) were added in a desired amount as outer percentage, followed by dry-mixing to obtain a raw material component. The raw material component was put into an alumina or platinum crucible and heated at 1500° C. for 30 to 60 minutes in an electric furnace to maintain a molten state, followed by being quenched by flowing down a brass plate. The resulting coarse glass was processed by a diamond cutter and a polishing device to prepare a glass sample of the light-emitting glass of the present invention.

Comparative Example 1

A mixed alkali borosilicate glass (15.0$Na_2O$-15.0$K_2O$-3.0$Al_2O_3$-17.0$B_2O_3$-50.0$SiO_2$ mol %) free from phase separation as a raw material of base glass and sodium carbonate ($Na_2CO_3$), potassium carbonate ($K_2CO_3$), alumina ($Al_2O_3$), boric acid ($H_3BO_3$), and ($SiO_2$) in a desired mole ratio were used to prepare a glass sample of a light-emitting glass of Comparative Example 1 using a process similar to the production process described above.

Figure 3:
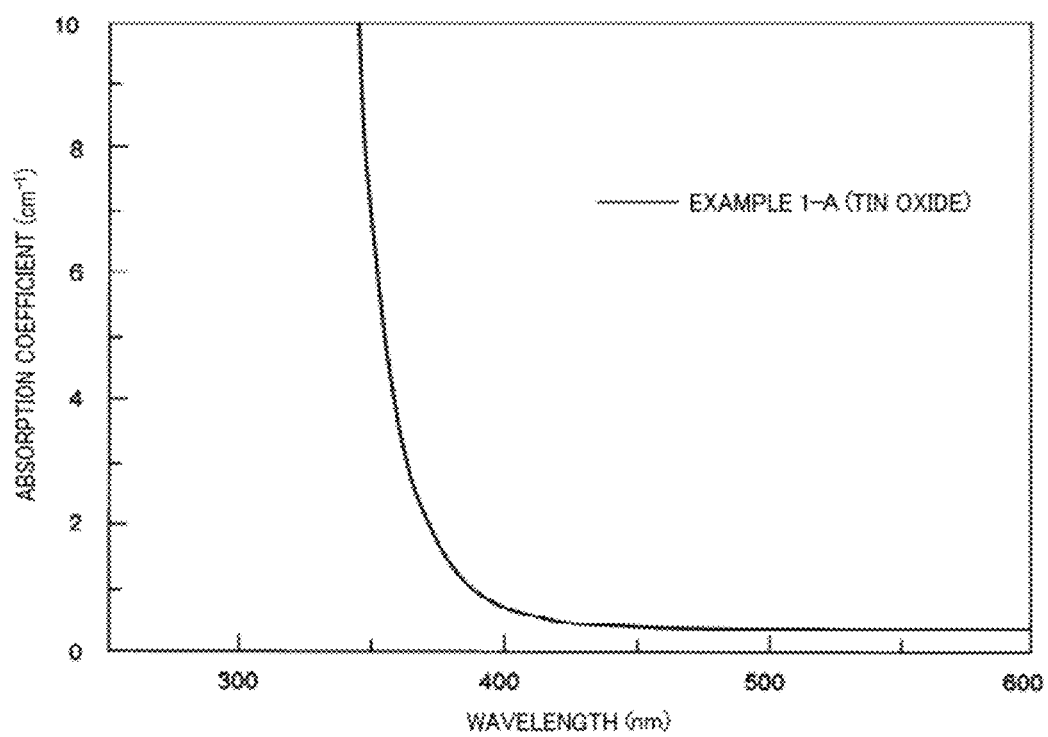
FIG. 3 is a graph showing an absorption spectrum of the case where tin oxide is added as a reducing agent in Evaluation (1)

Evaluation (1) (Case of Selecting Tin Oxide as Reducing Agent):

FIG. 3 shows an absorption spectrum of the case (Example 1-A) where 0.16 mol % of copper oxide ($Cu_2O$) was added on the basis of the composition of Example 1 and 1.6 mol % of tin oxide (SnO) was added as a reducing agent. As shown in FIG. 3, an absorption end of ultraviolet side appears at a position above 350 nm by adding tin oxide as a reducing agent, suggesting that there is absorption by copper ion cluster ($Cu^+$ cluster) and tin oxide.

Figure 5:
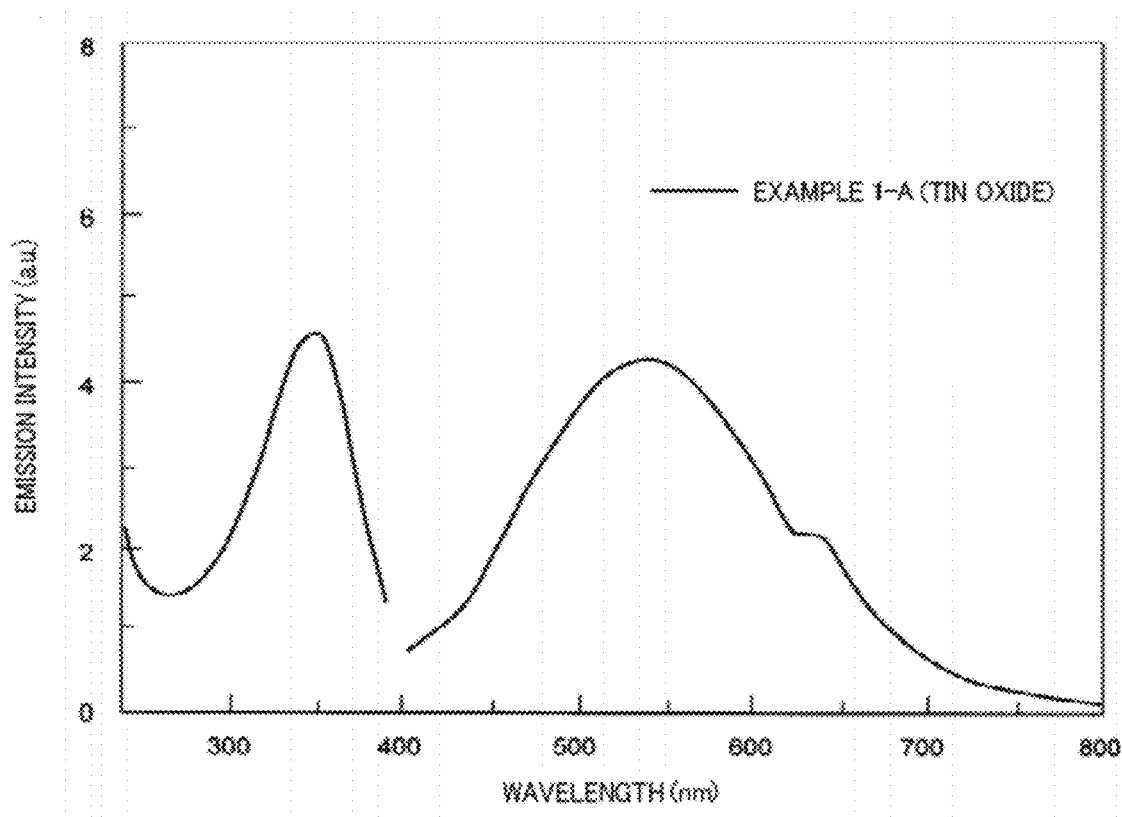
FIG. 5 is a graph showing an excitation spectrum and an emission spectrum of a glass sample in Evaluation (1)

Furthermore, FIG. 4 shows appearance photographs of the cases where Example 1-A was irradiated with white light or ultraviolet of central wavelength 254 nm or 365 nm; and FIG. 5 shows an excitation spectrum and an emission spectrum thereof. As shown in FIG. 4, Example 1-A (addition of tin oxide) appears clear and colorless under irradiation with white light. Besides, Example 1-A exhibited very weak blue fluorescence under irradiation with ultraviolet light of 254 nm; and Example 1-A exhibited almost only yellow fluorescence under irradiation with ultraviolet light of 365 nm.

These results also coincide with excitation and fluorescence spectra; as shown in FIG. 5, the glass sample of Example 1-A (addition of tin oxide) exhibited broad emission over an entire region of visible light of 400 nm to 800 nm, which is considered as a mixture of blue emission due to copper ion ($Cu^+$) and yellow to orange emission due to copper ion cluster ($Cu^+$ cluster); and it could be confirmed that emission in Example 1-A (addition of tin oxide) is mainly of yellow to orange emission due to copper ion cluster ($Cu^+$ cluster) since both of excitation spectrum and emission spectrum have shifted to longer wavelength side.

Evaluation (2) (Effect of Glass Composition):

Copper oxide of 0.5 mol % and tin oxide of 5.0 mol % as a reducing agent were added to $Na_2O$—$B_2O_3$—$SiO_2$ base glass having a separated-phase structure of Examples 1 and 2 or to a base glass not having a separated-phase structure of Comparative Example 1, thereby preparing glass samples (referred to as Example 1, Example 2, and Comparative Example 1 in order). In regards to the resulting glass samples, the relation between glass composition and absorption spectrum is shown in FIG. 6, appearance photographs of glass samples irradiated with white light or ultraviolet light of central wavelength 254 nm or 365 nm are shown in FIG. 7, and the relation between glass composition, excitation spectrum, and emission spectrum is shown in FIG. 8, respectively.

Figure 6:
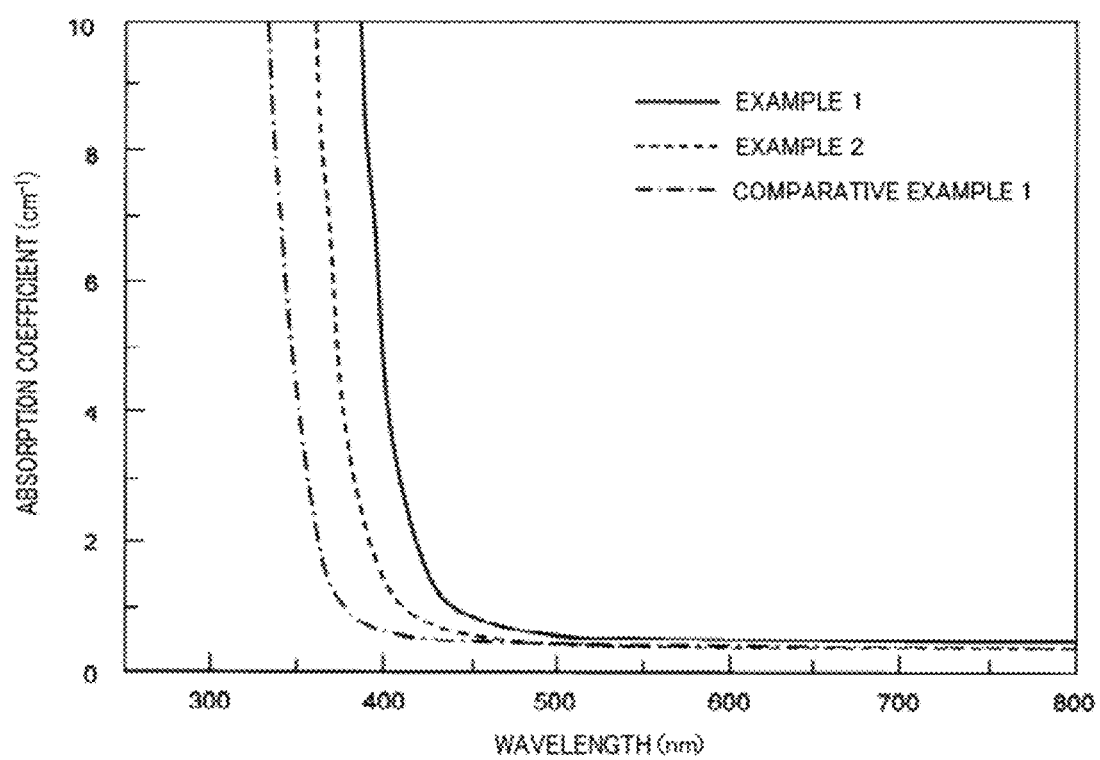
FIG. 6 is a graph showing a relation between a glass composition and an absorption spectrum in Evaluation (2)
Figure 7:
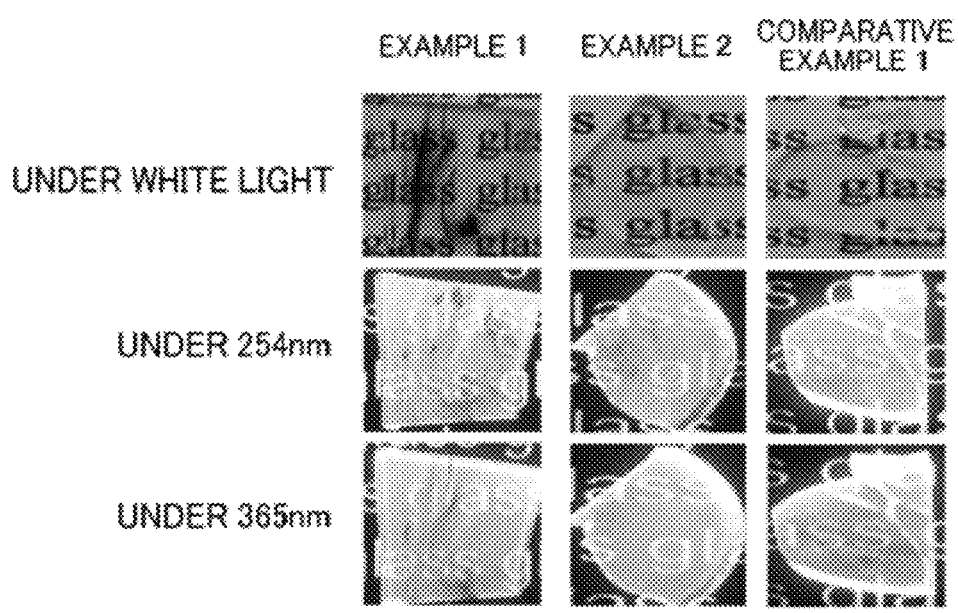
FIG. 7 is a view showing appearance photographs of glass samples which are irradiated with white light or ultraviolet light having a central wavelength of 254 nm or 365 nm in Evaluation (2)

As shown in FIG. 6, increase in excitation wavelength and emission wavelength was recognized for the glass samples of Examples 1 and 2 which use an alkali metal borosilicate glass having a separated-phase structure as the base glass compared to the glass sample of Comparative Example 1 which uses the mixed alkali borosilicate system glass not having a separated-phase structure as the base glass. Besides, as shown in FIG. 7, all of the glass samples are transparent in terms of appearance under white light irradiation. It could also be confirmed that yellow emission is noticeable in the light-emitting glass samples of Examples 1 and 2 under irradiation of ultraviolet light of 365 nm.

Figure 8:
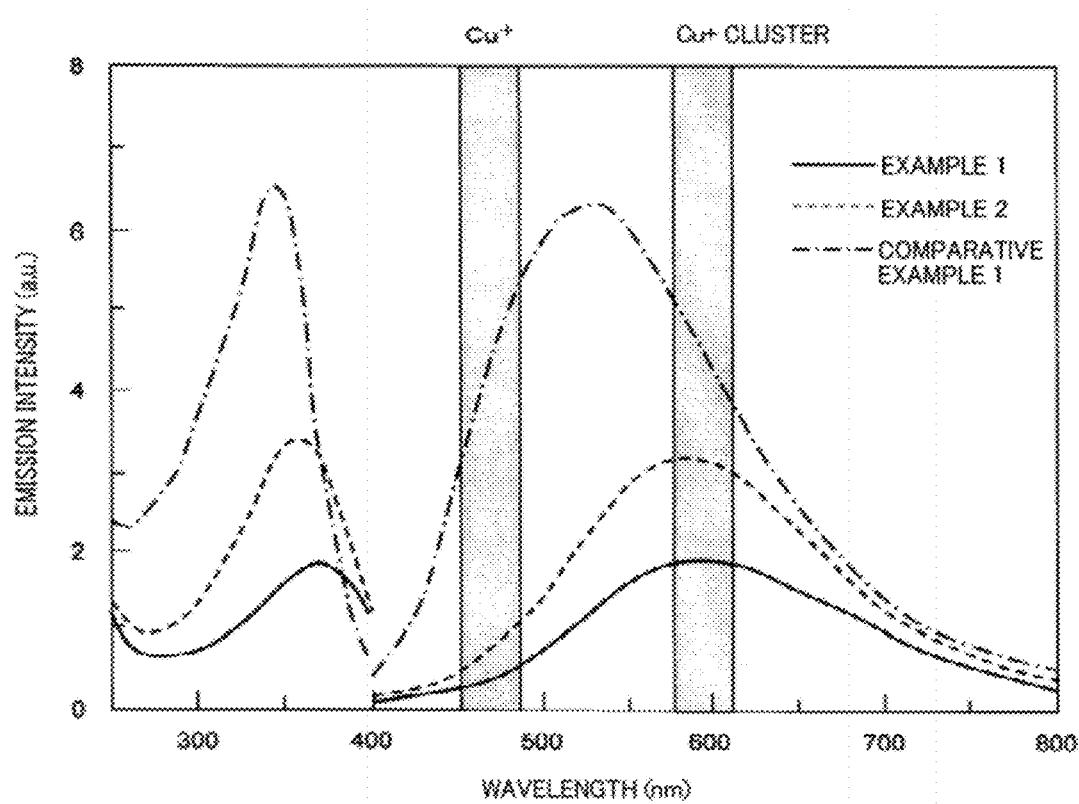
FIG. 8 is a graph showing a relation between a glass composition, an excitation spectrum, and an emission spectrum in Evaluation (2)

These results also coincide with the excitation and fluorescence spectra shown in FIG. 8, and all of the glass samples exhibited broad emission over an entire region of visible light of 400 nm to 800 nm, but both of excitation spectra and emission spectra of the glass samples in Examples 1 and 2 have shifted to longer wavelength side compared to those of Comparative Example 1. It could therefore be confirmed that emission in the separated-phase glass samples of Examples 1 and 2 is mainly of yellow to orange emission due to copper ion cluster ($Cu^+$ cluster).

Evaluation (3) (Effect of Additive Amount of Copper Oxide Added):

Using the base glasses of $Na_2O$—$B_2O_3$—$SiO_2$ system having a separated-phase structure in Examples 1 and 2, glass samples were prepared with setting the additive amount of copper oxide ($Cu_2O$) to be 0.1, 0.3, and 0.5 mol % as outer percentage for Example 1 and 0.1, 0.3, 0.5, 1.0, and 1.5 mol % as outer percentage for Example 2. In addition, tin oxide (SnO) was used as a reducing agent and added at 5.0 mol % as outer percentage.

Figure 9:
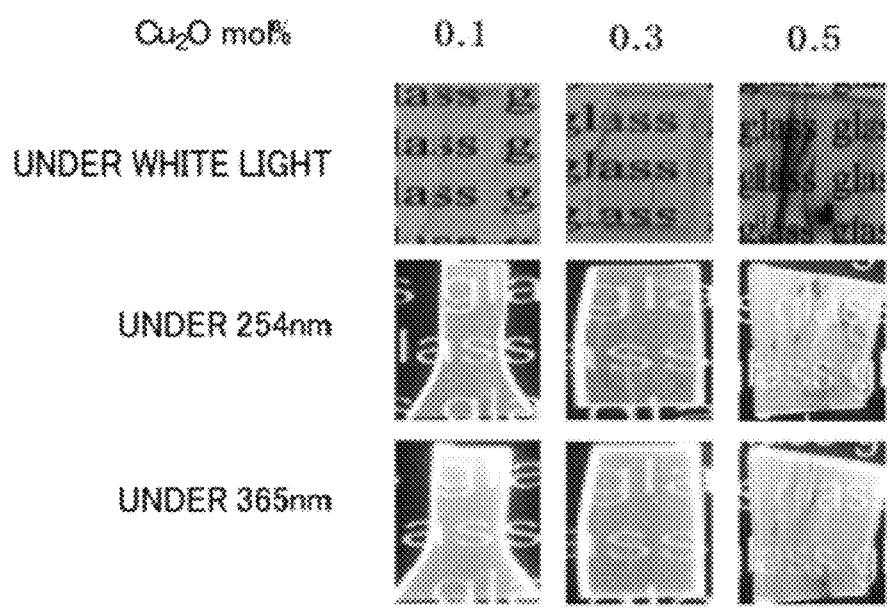
FIG. 9 is a view showing appearance photographs of glass samples in Example 1 which are irradiated with white light or ultraviolet light having a central wavelength of 254 nm or 365 nm in Evaluation (3)
Figure 10:
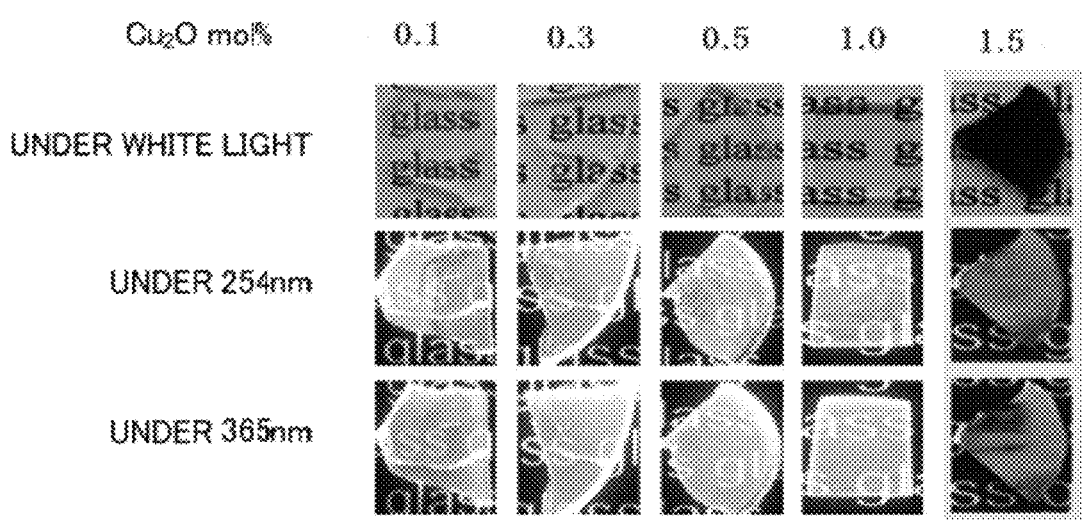
FIG. 10 is a view showing appearance photographs of glass samples in Example 2 which are irradiated with white light or ultraviolet light having a central wavelength of 254 nm or 365 nm in Evaluation (3)

The appearance photographs of the glass samples irradiated with white light or ultraviolet light of central wavelength 254 nm or 365 nm are shown in FIG. 9 (Example 1) and FIG. 10 (Example 2) in relation to additive amounts of copper oxide added. As shown in FIGS. 9 and 10, it could be confirmed that yellow emission becomes more intense as the additive amount of copper oxide added is increased. Additionally, the glass sample of Example 1 at an additive amount of 0.5 mol % and the glass sample of Example 2 at an additive amount of 1.5 mol % exhibited red coloration due to copper colloid (Cu colloid).

Figure 11:
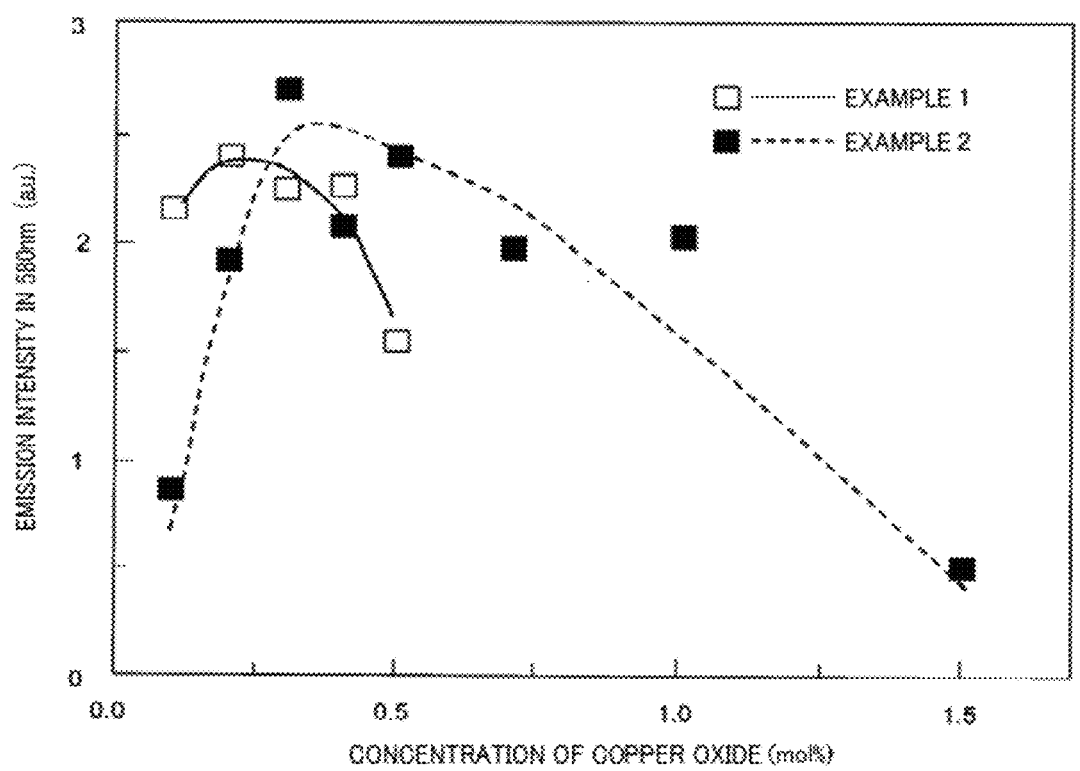
FIG. 11 is a graph showing a relation of an emission intensity (intensity of yellow emission) versus an additive amount of copper oxide in Evaluation (3)

Furthermore, FIG. 11 shows a relation of an additive amount of copper oxide when wavelength intensity is 580 nm, considered to exhibit yellow emission, versus emission intensity (yellow emission intensity). As shown in FIG. 11, the yellow emission intensity depends on the additive amount of copper oxide added, and a maximum appeared at an additive amount of about 0.2 mol % in the glass sample of Example 1 and at an additive amount of about 0.3 mol % in the glass sample of Example 2. It could also be confirmed that the glass sample of Example 1 exhibits yellow to orange emission of the same level as the glass sample of Example 2 even in an addition of less amount of copper oxide ($Cu^+$ ion).

Evaluation (4) (Effect of Species of Alkali Metal)

In this evaluation, three types of basic composition of base glass, considered to be within an area having a separated-phase structure, such as of Example 1 (base glass of light-emission glass: $6.6R_2O$-$28.3B_2O_3$-$65.1SiO_2$ mol %), Example 2 (base glass of light-emission glass: $11.5R_2O$-$44.0B_2O_3$-$44.5SiO_2$ mol %), and Example 3 (base glass of light-emission glass: $15.0R_2O$-$57.0B_2O_3$-$28.0SiO_2$ mol %) were employed, lithium (Li) and potassium (K) were used in addition to sodium (Na) as alkali metal R, and an additive amount of 0.2 mol % of copper oxide and an additive amount of 5.0 mol % of tin oxide as a reducing agent were added for preparing light-emitting glass, thereby preparing 9 species of glass samples.

When the resulting 9 species of glass samples were excited under irradiation by ultraviolet light of central wavelength 365 nm, all of the glass samples exhibited emission of yellow white to yellow emission, and blue emission could be confirmed in the case of excitation under irradiation by ultraviolet light of central wavelength 254 nm; therefore, it could be confirmed that both of copper ion ($Cu^+$) and copper ion cluster ($Cu^+$ cluster) exist in the Li and K glass systems also similarly as the Na glass system and the latter is dominant.

Figure 12:
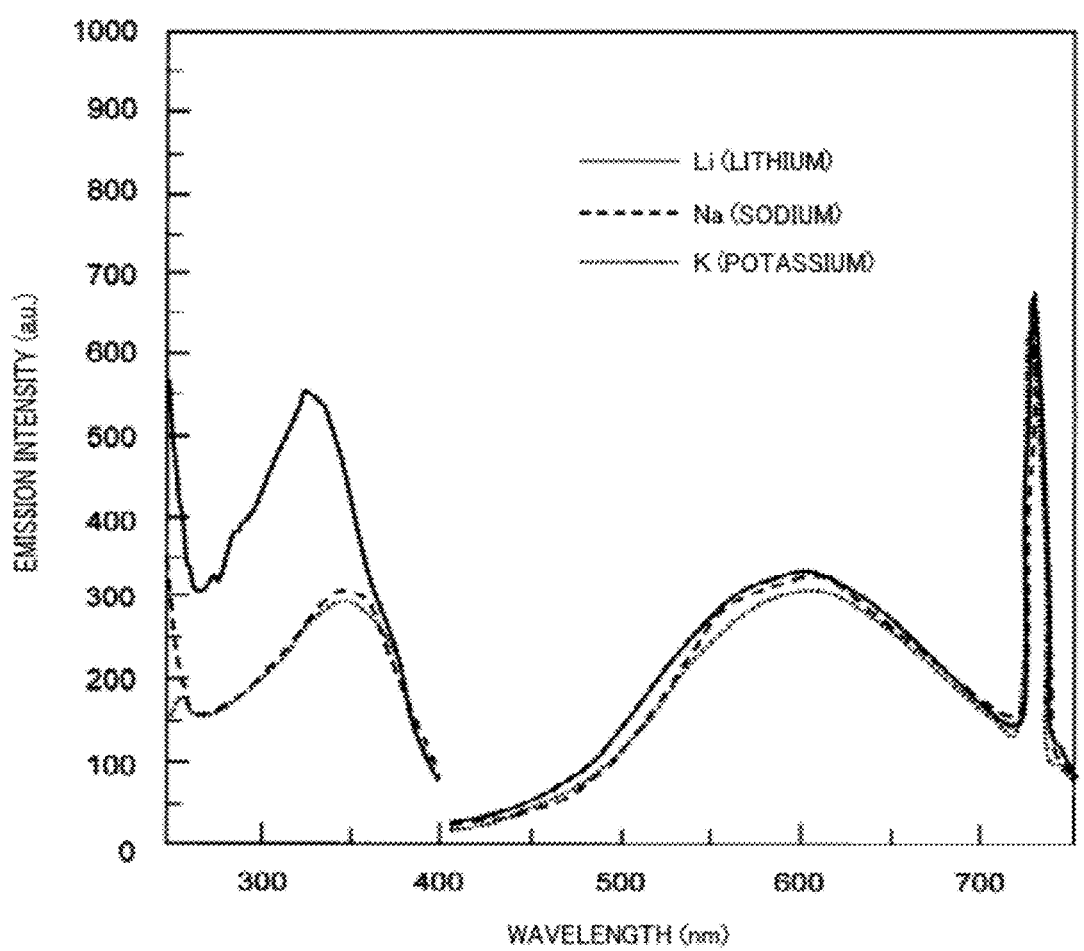
FIG. 12 is a graph, with respect to a composition of Example 1, showing fluorescence spectra under excitation by near-ultraviolet light of wavelength 365 nm and excitation spectra where a maximum emission wavelength is a monitor wavelength.
Figure 13:
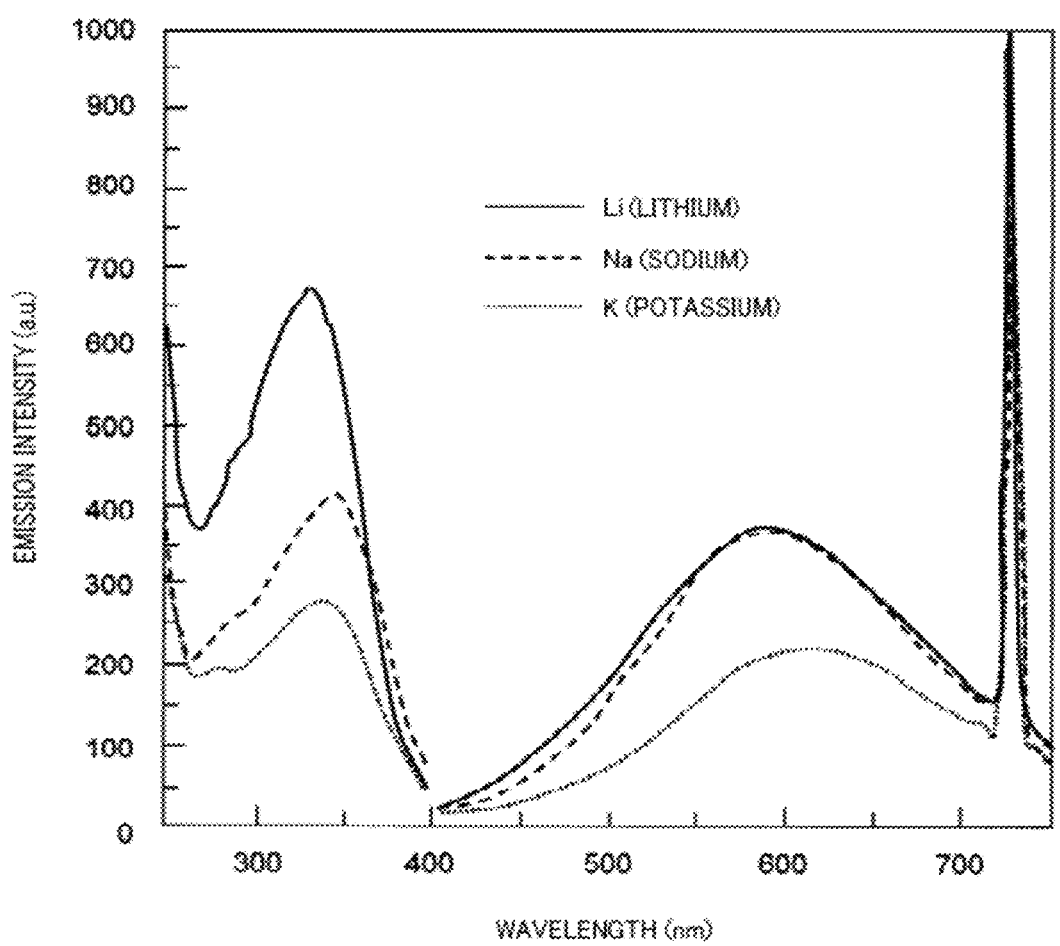
FIG. 13 is a graph, with respect to a composition of Example 2, showing fluorescence spectra under excitation by near-ultraviolet light of wavelength 365 nm and excitation spectra where a maximum emission wavelength is a monitor wavelength.
Figure 14:
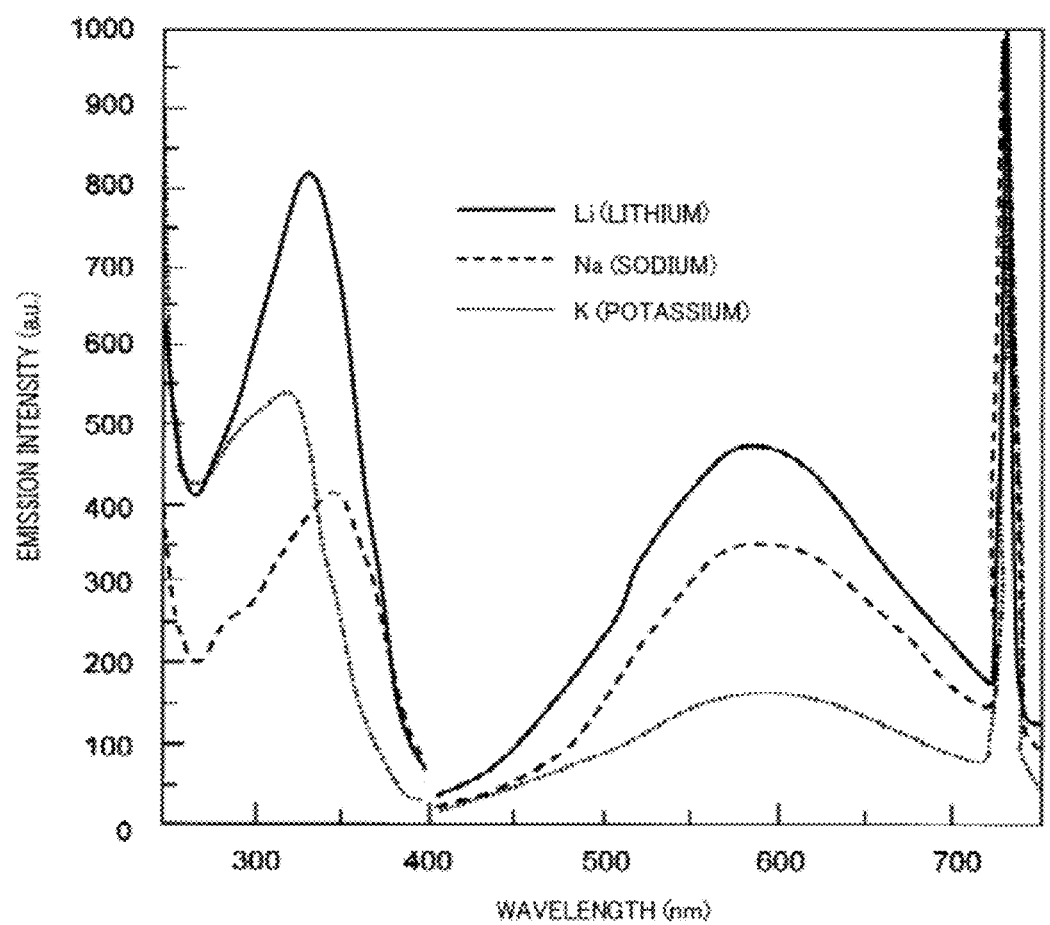
FIG. 14 is a graph, with respect to a composition of Example 3, showing fluorescence spectra under excitation by near-ultraviolet light of wavelength 365 nm and excitation spectra where a maximum emission wavelength is a monitor wavelength.

Furthermore, with respect to the resulting 9 species of glass samples, fluorescence spectra under the excitation by near-ultraviolet light of central wavelength 365 nm and excitation spectra using a maximum emission wavelength as a monitor wavelength are shown in FIG. 12 (composition of Example 1), FIG. 13 (composition of Example 2), and FIG. 14 (composition of Example 3), respectively.

As shown in FIGS. 12 to 14, all of the glass samples exhibited broad emission over an entire region of visible light of 400 nm to 800 nm under the excitation by near-ultraviolet light of central wavelength 365 nm. By reason that the peak tops exist around 600 nm, it is considered that blue emission due to $Cu^+$ and yellow to orange emission due to copper ion cluster ($Cu^+$ cluster) are combined also in the Li and K glass systems similarly as the Na glass system and the latter is dominant. As $R_2O$—$B_2O_3$ in their compositions increased, emission intensity became larger in the Li system, became smaller in the K system conversely, and did not change notably in the Na system. It is also understood that emission intensity becomes larger in the order of K, Na, and Li in terms of alkali metal species within the range of samples containing larger $R_2O$—$B_2O_3$ but it does not depend on the alkali metal species within the range of samples containing larger $SiO_2$.

Evaluation (5) (Effect of Additive Amount of Copper Oxide Added):

Using the base glass of $Na_2O$—$B_2O_3$—$SiO_2$ system having a separated-phase structure of Example 1 ($6.6Na_2O$-$28.3B_2O_3$-$65.1SiO_2$ mol %), glass samples were prepared with setting the additive amount of copper oxide ($Cu_2O$) to be 0.1, 0.2, 0.3, 0.4, and 0.5 mol % as outer percentage. In addition, tin oxide (SnO) was used as a reducing agent and added at 5.0 mol % as outer percentage.

Figure 15:
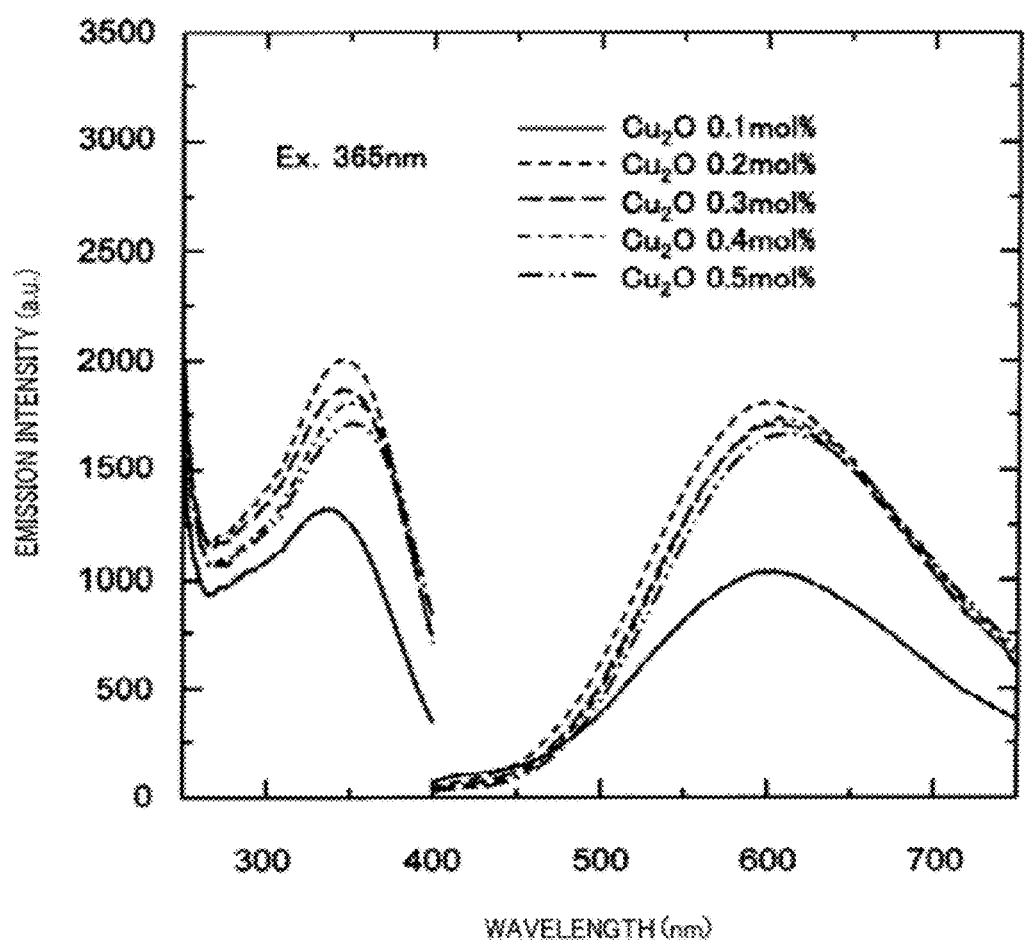
FIG. 15 is a graph showing fluorescence spectra under excitation by near-ultraviolet light of wavelength 365 nm in Evaluation (5)

Then the glass samples of Example 1 were confirmed with respect to fluorescence spectra under the excitation by near-ultraviolet light of wavelength 365 nm and fluorescence spectra under the excitation by ultraviolet light of wavelength 254 nm versus the additive amount of copper oxide added. The results are shown in FIG. 15 (365 nm) and FIG. 16 (254 nm). Besides, FIG. 17 is a graph showing a relation between copper oxide ($Cu_2O$) added and emission intensity. Additionally, values of peak top at about 600 nm in the case of central wavelength 365 nm and peak top at about 470 nm in the case of central wavelength 254 nm were employed as the emission intensity (same in FIG. 22 below).

As the excitation by near-ultraviolet light of central wavelength 365 nm is shown by FIG. 15, broad emission over an entire region of visible light of 400 nm to 700 nm was wholly observed, peak tops existed around 580 to 600 nm, and yellow to orange emission due to copper ion cluster ($Cu^+$ cluster) could be confirmed. As shown in FIG. 17, the emission intensity was almost stable when the additive amount of copper oxide ($Cu_2O$) was above 0.2 mol %.

Figure 16:
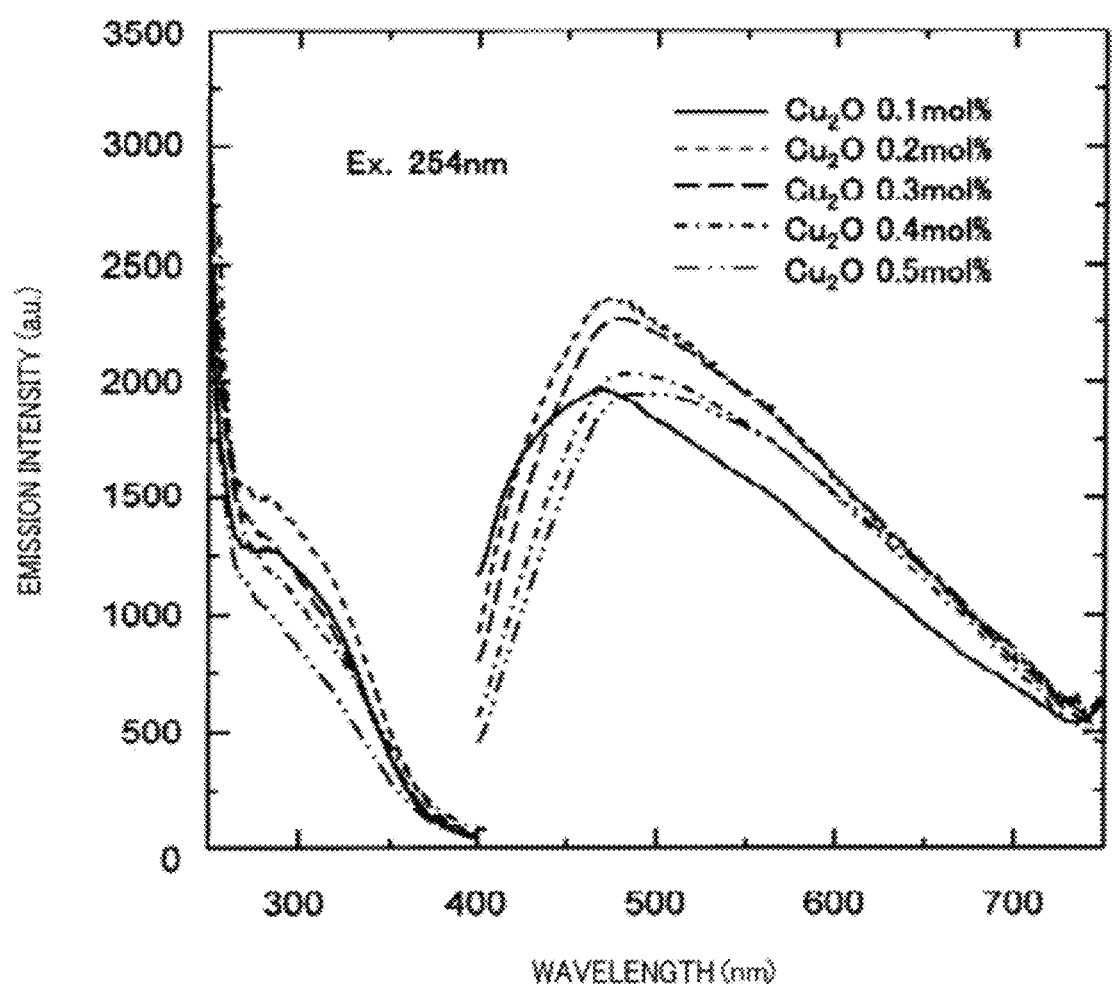
FIG. 16 is a graph showing fluorescence spectra under excitation by near-ultraviolet light of wavelength 254 nm in Evaluation (5)
Figure 17:
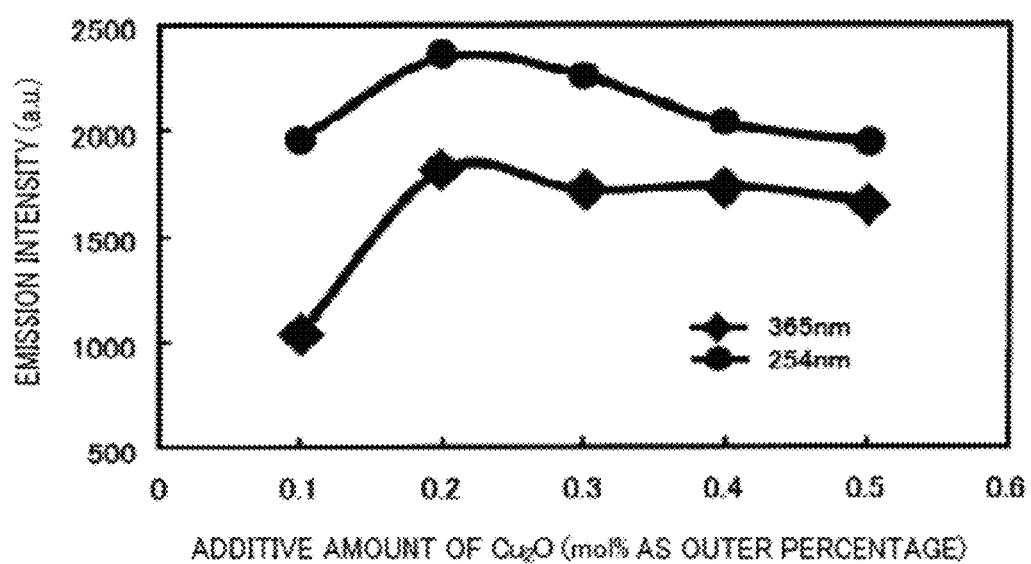
FIG. 17 is a graph showing a relation between copper oxide ($Cu_2O$) added and emission intensity in Evaluation (5)

Additionally, as the excitation of central wavelength 254 nm is shown by FIG. 16, similarly as those of 365 nm, broad emission over an entire region of visible light of 400 nm to 700 nm was wholly observed, peak tops existed around 460 to 480 nm, and blue emission due to copper ion ($Cu^+$) could be confirmed. As shown in FIG. 17, the emission intensity was likely to somewhat decrease as the amount of copper oxide ($Cu_2O$) increased when the additive amount of copper oxide ($Cu_2O$) was above 0.2 mol %.

Evaluation (6) (Investigation of Presence or Absence of Tin Oxide (SnO)):

Using the base glass of $Na_2O$—$B_2O_3$—$SiO_2$ system having a separated-phase structure of Example 1 (6.6$Na_2O$-28.3$B_2O_3$-65.1$SiO_2$ mol %), glass samples were prepared without adding tin oxide (SnO) of a reducing agent. The additive amount of copper oxide ($Cu_2O$) added as a source of transition metal ion cluster was 0.2 mol % as outer percentage. For reference, a glass sample was also prepared using the above-described composition of the base glass with setting the additive amount of tin oxide (SnO) to be 5.0 mol % as outer percentage and the additive amount of copper oxide ($Cu_2O$) added as a source of transition metal ion cluster to be 0.2 mol % as outer percentage and evaluated together.

Then the glass sample prepared without adding tin oxide (SnO) and the glass sample with tin oxide (SnO) of 5.0 mol % as outer percentage and copper oxide ($Cu_2O$) added as a source of transition metal ion cluster in the additive amount of 0.2 mol % as outer percentage were confirmed with respect to fluorescence spectra under the excitation by near-ultraviolet light of central wavelength 365 nm and fluorescence spectra under the excitation by ultraviolet light of wavelength 254 nm. The results are shown in FIG. 18 (365 nm) and FIG. 19 (254 nm).

Figure 18:
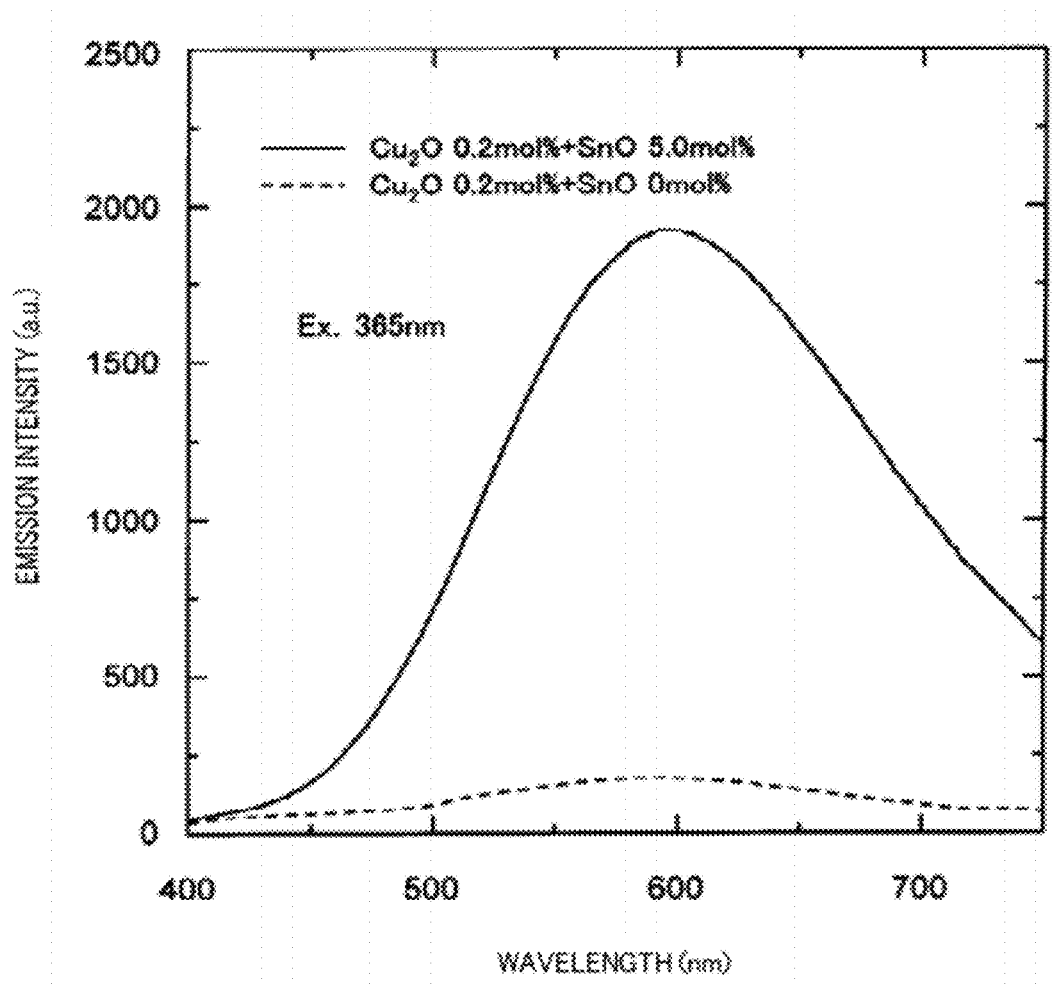
FIG. 18 is a graph showing fluorescence spectra under excitation by near-ultraviolet light of wavelength 365 nm in Evaluation (6)

As shown in FIG. 18, under the excitation by near-ultraviolet light of central wavelength 365 nm, yellow to orange emission due to copper ion cluster ($Cu^+$ cluster) could be confirmed for the glass sample prepared without adding tin oxide (SnO) but the peak was small.

Figure 19:
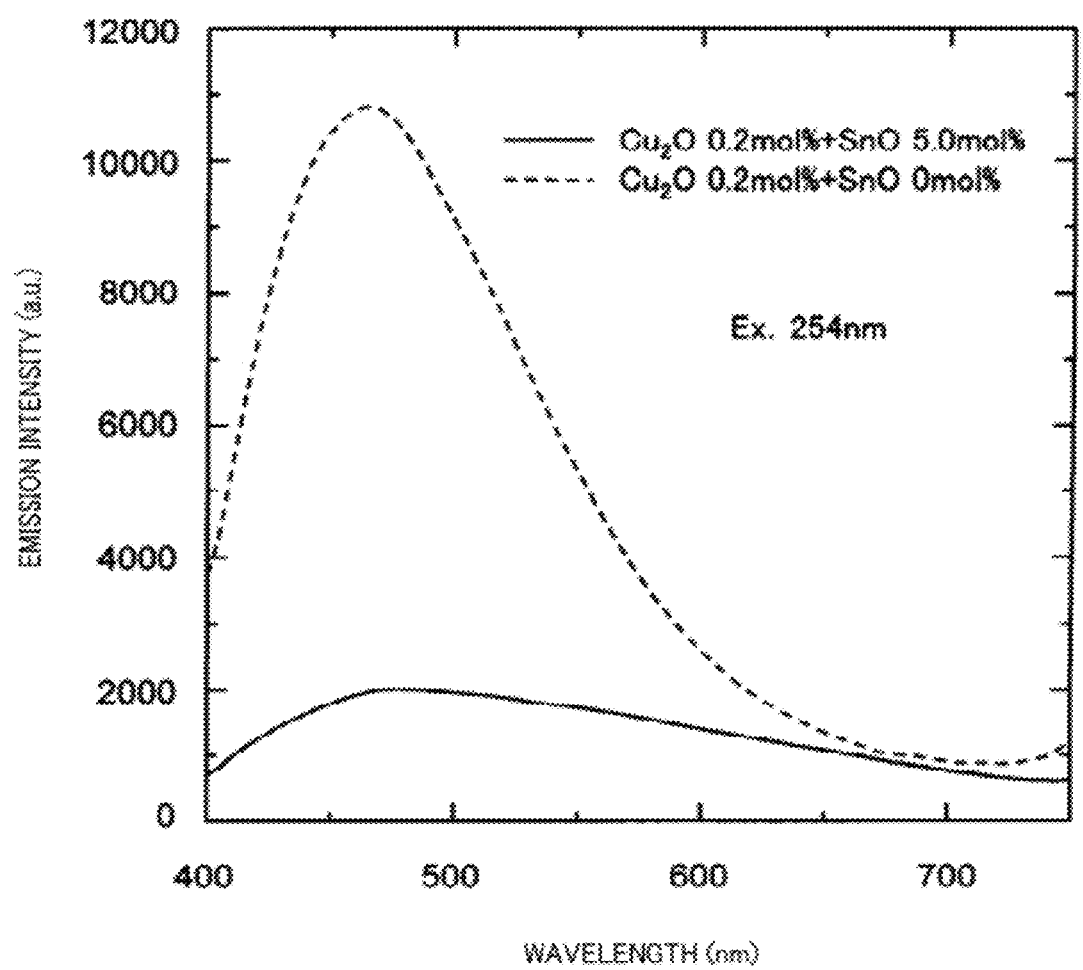
FIG. 19 is a graph showing fluorescence spectra under excitation by ultraviolet light of wavelength 254 nm in Evaluation (6)

Additionally, under the excitation of central wavelength 254 nm as shown in FIG. 19, the glass sample without addition of tin oxide exhibited broad emission over an entire region of visible light of 400 nm to 700 nm, a peak top existed around 460 to 480 nm, and blue emission due to copper ion ($Cu^+$) could be confirmed.

Evaluation (7) (Investigation of Additive Amount of Tin Oxide (SnO)):

Using the base glass of $Na_2O$—$B_2O_3$—$SiO_2$ system having a separated-phase structure of Example 1 (6.6$Na_2O$-28.3$B_2O_3$-65.1$SiO_2$ mol %), glass samples were prepared with setting the additive amount of tin oxide (SnO), used as a reducing agent during production, to be 1.0, 3.0, 5.0, and 7.0 mol % as outer percentage. Here, the additive amount of copper oxide ($Cu_2O$) added as a source of transition metal ion cluster was 0.2 mol % as outer percentage.

Figure 20:
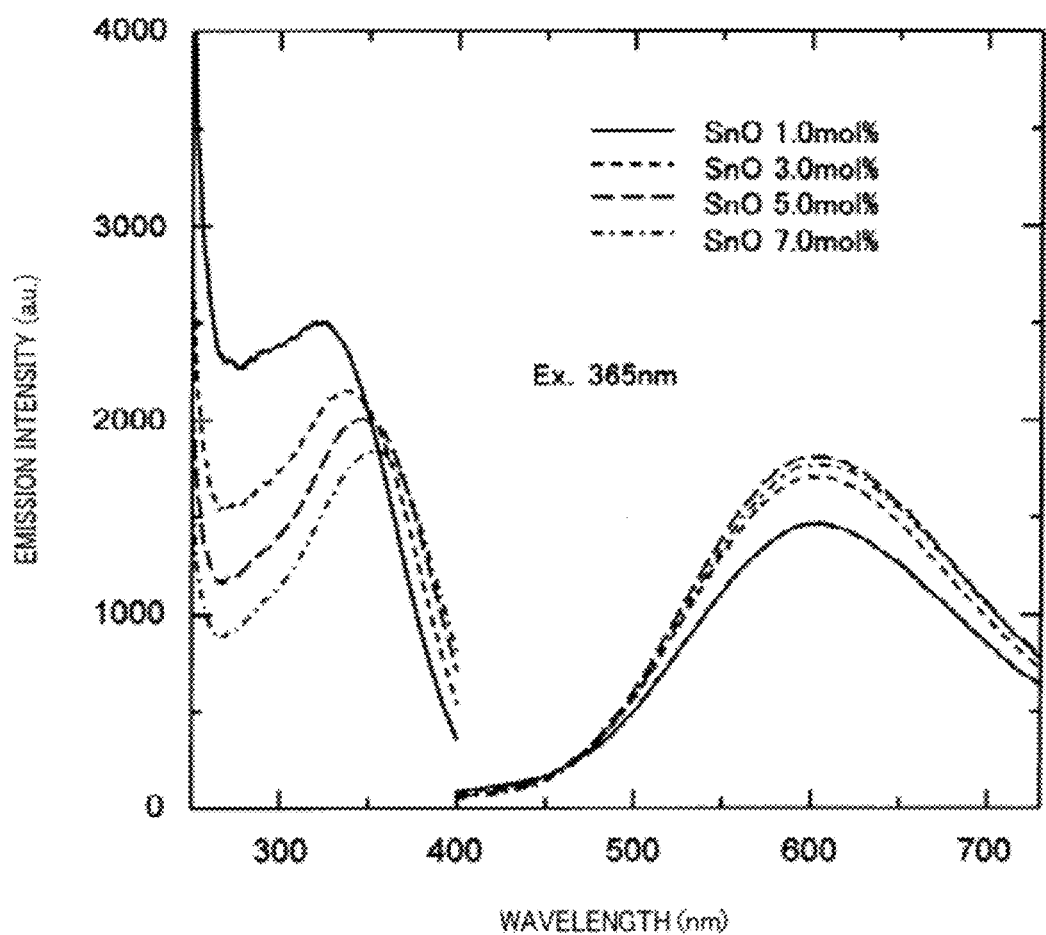
FIG. 20 is a graph showing fluorescence spectra under excitation by near-ultraviolet light of wavelength 365 nm in Evaluation (7)

Then the glass samples of Example 1 prepared with changing the additive amount of tin oxide added as a reducing agent during production were confirmed with respect to fluorescence spectra under the excitation by near-ultraviolet light of central wavelength 365 nm and fluorescence spectra under the excitation by ultraviolet light of wavelength 254 nm. The results are shown in FIG. 20 (365 nm) and FIG. 21 (254 nm). Besides, FIG. 22 is a graph showing a relation between tin oxide (SnO) added and emission intensity.

As shown in FIG. 20, under the excitation by near-ultraviolet light of central wavelength 365 nm, all of the glass samples added with tin oxide exhibited broad emission over an entire region of visible light of 400 nm to 700 nm, peak tops existed around 580 to 600 nm, and yellow to orange emission due to copper ion cluster ($Cu^+$ cluster) could be confirmed. As shown in FIG. 22, as the additive amount of tin oxide was increased the emission intensity increased slightly.

Figure 21:
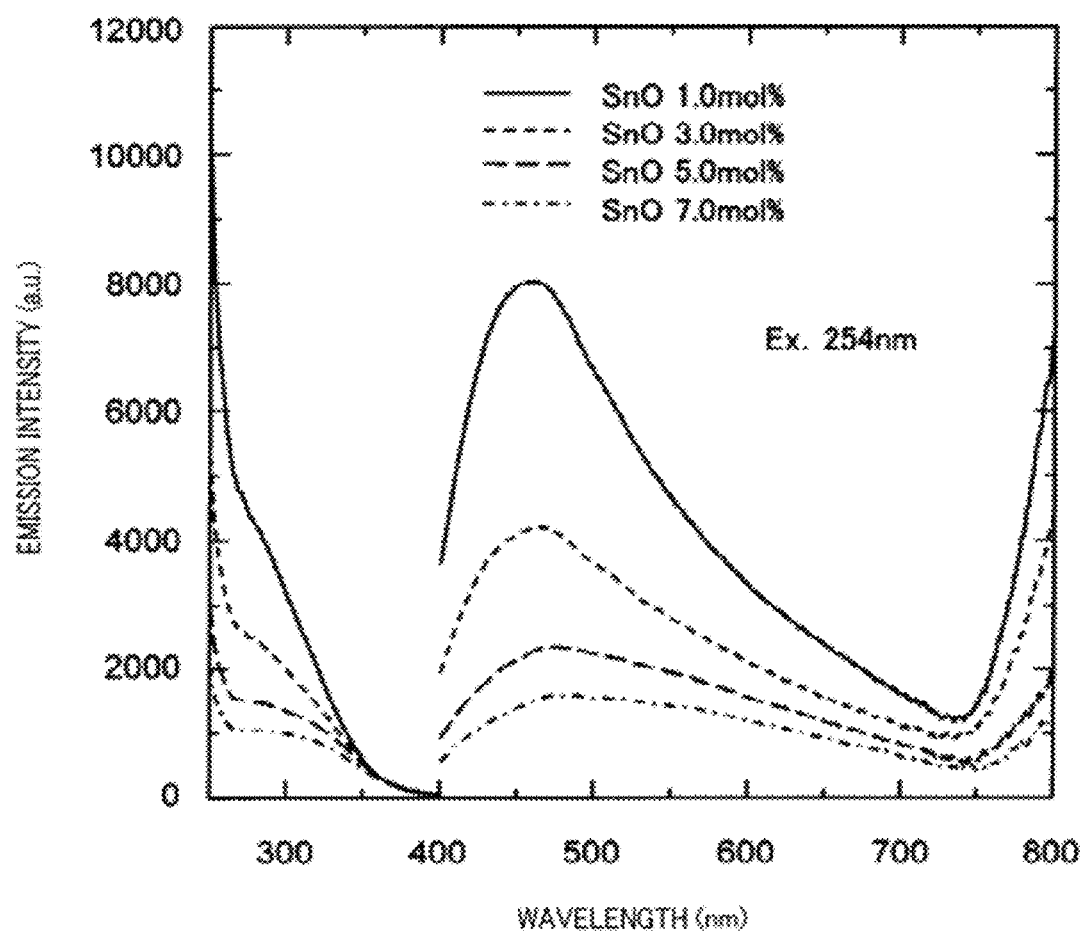
FIG. 21 is a graph showing fluorescence spectra under excitation by ultraviolet light of wavelength 254 nm in Evaluation (7)
Figure 22:
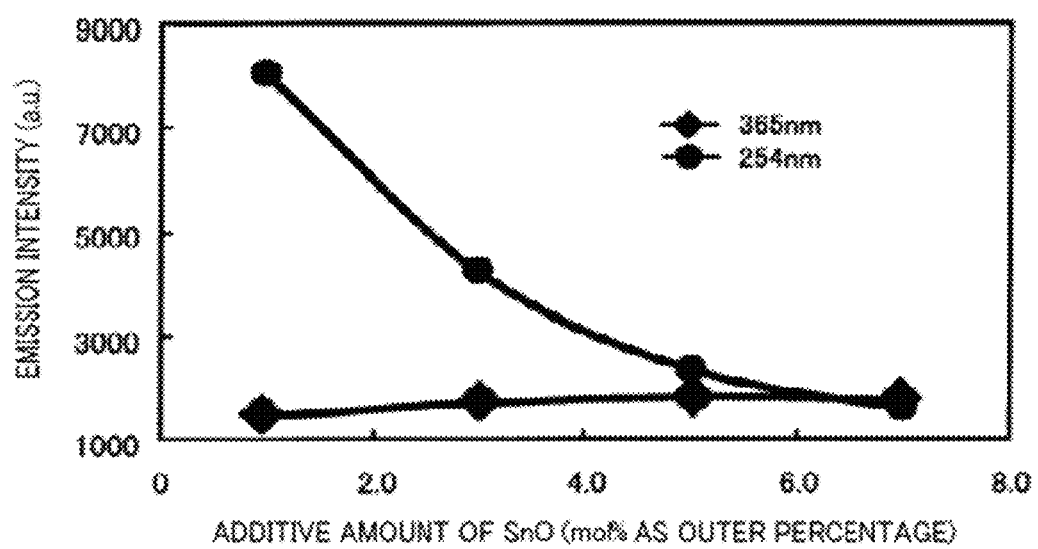
FIG. 22 is a graph showing a relation between tin oxide (SnO) added and emission intensity in Evaluation (7)

Additionally, under the excitation of central wavelength 254 nm as shown in FIG. 21, similarly as those of 365 nm, broad emission over an entire region of visible light of 400 nm to 700 nm was wholly observed, peak tops existed around 460 to 480 nm, and blue emission due to copper ion ($Cu^+$) could be confirmed. As shown in FIG. 22, the emission intensity became smaller as the additive amount of tin oxide was increased.

Evaluation (8) (Relation with Transition Metal Ion Cluster):

Using the base glass of $Na_2O$—$B_2O_3$—$SiO_2$ system having a separated-phase structure of Example 1 (6.6$Na_2O$-28.3$B_2O_3$-65.1$SiO_2$ mol %), silver nitrate ($AgNO_3$; transition metal ion cluster: $Ag^+$ ion cluster; "A" in FIGS. 23 and 24 described later), manganese dioxide ($MnO_2$; transition metal ion cluster: $Mn^{2+}$ ion cluster; "B"), silver oxide ($Ag_2O$; transition metal ion cluster: $Ag^+$ ion cluster; "C"), and chromium oxide ($Cr_2O_3$; transition metal ion cluster: $Cr^{3+}$ ion cluster; "D") were selected as the species of the compound added as the source of the transition metal ion cluster in place of copper oxide, thereby preparing glass samples. Here, the additive amount of the compounds added was 0.2 mol % as outer percentage, and tin oxide (SnO) was used as a reducing agent and added at 5.0 mol % as outer percentage.

Then the glass samples of Example 1 were confirmed with respect to fluorescence spectra under the excitation by near-ultraviolet light of central wavelength 365 nm and fluorescence spectra under the excitation by ultraviolet light of wavelength 254 nm versus the species of the compounds added as the source of the transition metal ion cluster. The results are shown in FIG. 23 (365 nm) and FIG. 24 (254 nm).

Figure 23:
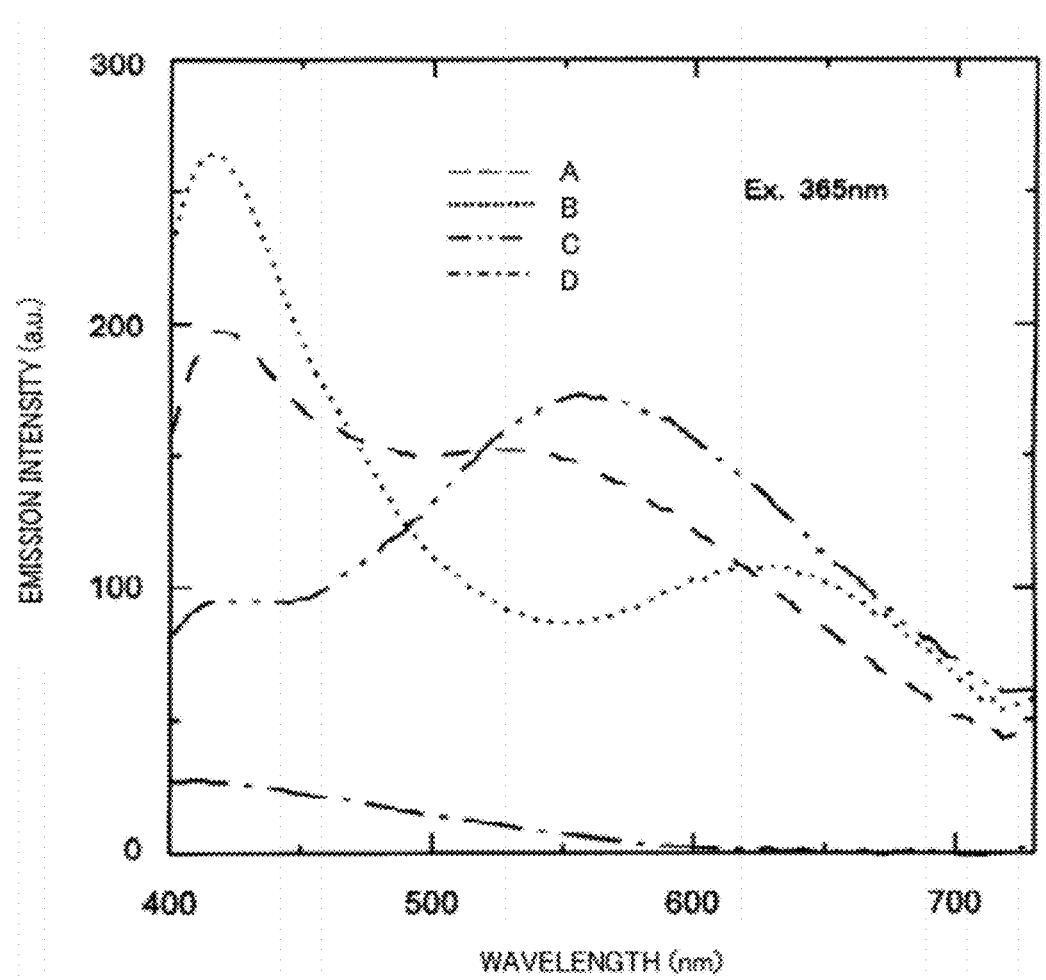
FIG. 23 is a graph showing fluorescence spectra under excitation by near-ultraviolet light of wavelength 365 nm in Evaluation (8)

Under the excitation by near-ultraviolet light of central wavelength 365 nm as shown in FIG. 23, glass samples, in which the transition metal ion cluster is $Ag^+$ ion cluster by using silver nitrate ($AgNO_2$; transition metal ion cluster: $Ag^+$) or silver oxide ($Ag_2O$; transition metal ion cluster: $Ag^+$), exhibited broad emission over an entire region of visible light of 400 nm to 700 nm, and emission of 500 to 700 nm considered to be yellow to orange emission due to silver ion cluster ($Ag^+$ cluster) could be confirmed.

Figure 24:
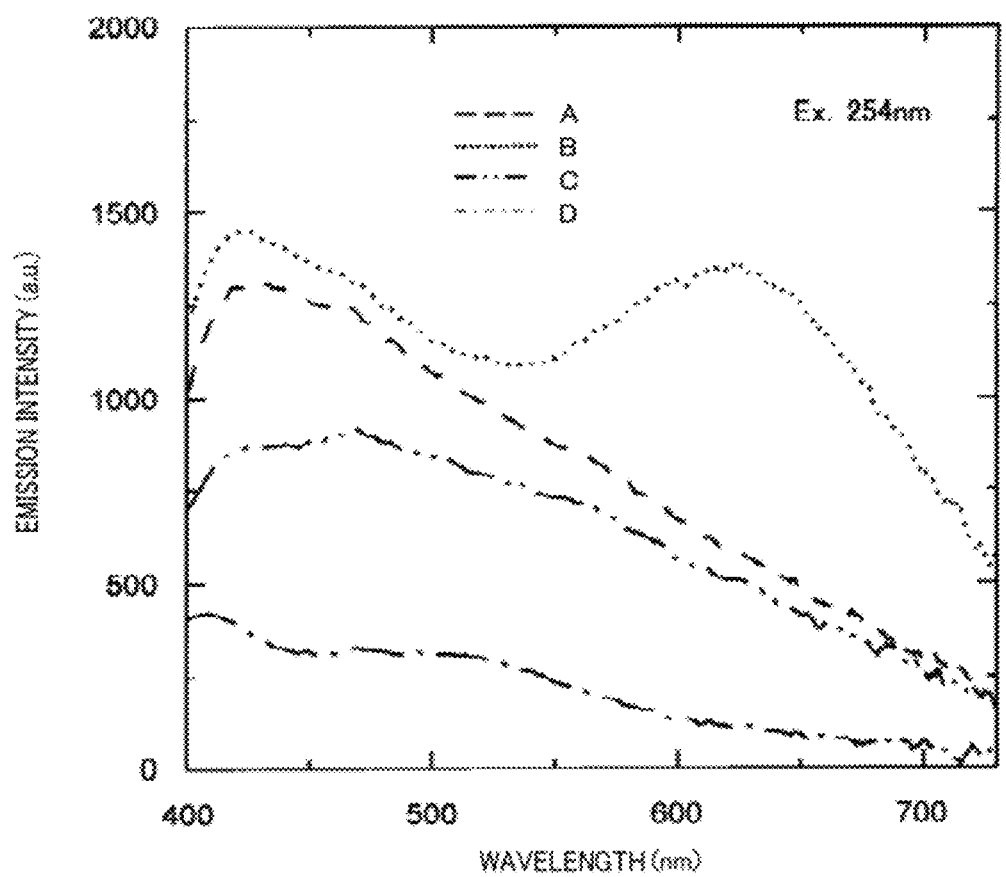
FIG. 24 is a graph showing fluorescence spectra under excitation by ultraviolet light of wavelength 254 nm in Evaluation (8)

Additionally, under the excitation of central wavelength 254 nm as shown in FIG. 24, broad emission over an entire region of visible light of 400 nm to 700 nm was observed, peak tops existed around 460 to 480 nm, and blue emission due to silver ion ($Ag^+$), etc. could be confirmed.

Examples 3 to 5

Preparation of Light-Emitting Glass using Silicate Glass

Three compositions, having a basic composition of $Na_2O$—$SiO_2$ (NS system) and considered to have a separated-phase structure, were selected for base glasses (base glass of light-emitting glass in Example 3: 15.0$Na_2O$-85.0$SiO_2$ mol % ("E" in FIGS. 25 and 26 described later);

base glass of light-emitting glass in Example 4: 20.0Na$_2$O-80.0SiO$_2$ mol % ("F"); and base glass of light-emitting glass in Example 5: 30.0Na$_2$O-70.0SiO$_2$ mol % ("G")). Here, the additive amount of copper oxide (Cu$_2$O) added was 0.2 mol % as outer percentage, and tin oxide (SnO) of 5.0 mol % as outer percentage was used as a reducing agent.

An essential production process is such that sodium carbonate (Na$_2$CO$_3$) and silica (SiO$_2$) are used as raw materials of a base glass and weighed in a desired mole ratio, then to which copper oxide (Cu$_2$O) of 0.2 mol % as outer percentage and a reducing agent (tin oxide (SnO)) of 5.0 mol % as outer percentage were added, followed by dry-mixing to obtain a raw material component. The raw material component was put into an alumina or platinum crucible and heated at 1500° C. for 30 to 60 minutes in an electric furnace to maintain a molten state, followed by being quenched by flowing down like a brass plate. The resulting coarse glass was processed by a diamond cutter and a polishing device to prepare a glass sample of the light-emitting glass of the present invention.

Evaluation (9) (Case of Silicate Glass as Base Glass):

The glass samples of Examples 3 to 5 were confirmed with respect to fluorescence spectra under the excitation by near-ultraviolet light of central wavelength 365 nm and fluorescence spectra under the excitation by ultraviolet light of wavelength 254 nm. The results are shown in FIG. 25 (365 nm) and FIG. 26 (254 nm). For reference, a glass sample ("H" in FIGS. 25 and 26), prepared from the above-described composition of the base glass of Example 1 (6.6Na$_2$O-28.3B$_2$O$_3$-65.1SiO$_2$ mol %) with adding copper oxide (Cu$_2$O) of 0.2 mol % as outer percentage as a source of transition metal ion cluster and tin oxide (SnO) of 0.2 mol % as outer percentage as a reducing agent, was similarly evaluated.

Figure 25:
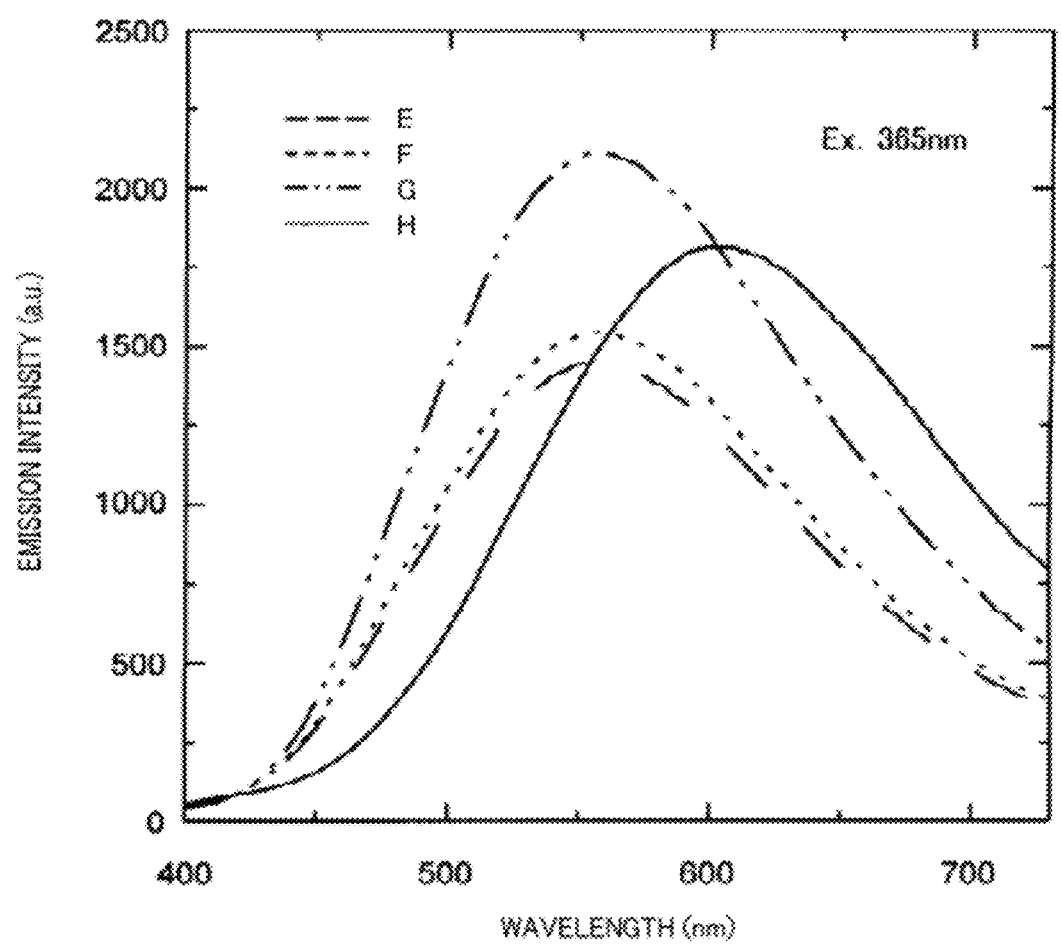
FIG. 25 is a graph showing fluorescence spectra under excitation by near-ultraviolet light of wavelength 365 nm in Evaluation (9)

As shown in FIG. 25, the glass samples of Examples 3 to 5 exhibited broad emission over an entire region of visible light of 400 nm to 700 nm under the excitation by near-ultraviolet light of central wavelength 365 nm. Yellow to orange emission due to copper ion cluster (Cu$^+$ cluster) could be confirmed, however, the peak top has sifted somewhat to the side of shorter wavelength compared to that of the base glass composition of 6.6Na$_2$O-28.3B$_2$O$_3$-65.1SiO$_2$ mol % and slightly white-tinged yellow to orange emission was confirmed. The emission intensities became more intense as the content of Na$_2$O in the base glass increased (as the content of SiO$_2$ decreased).

Figure 26:
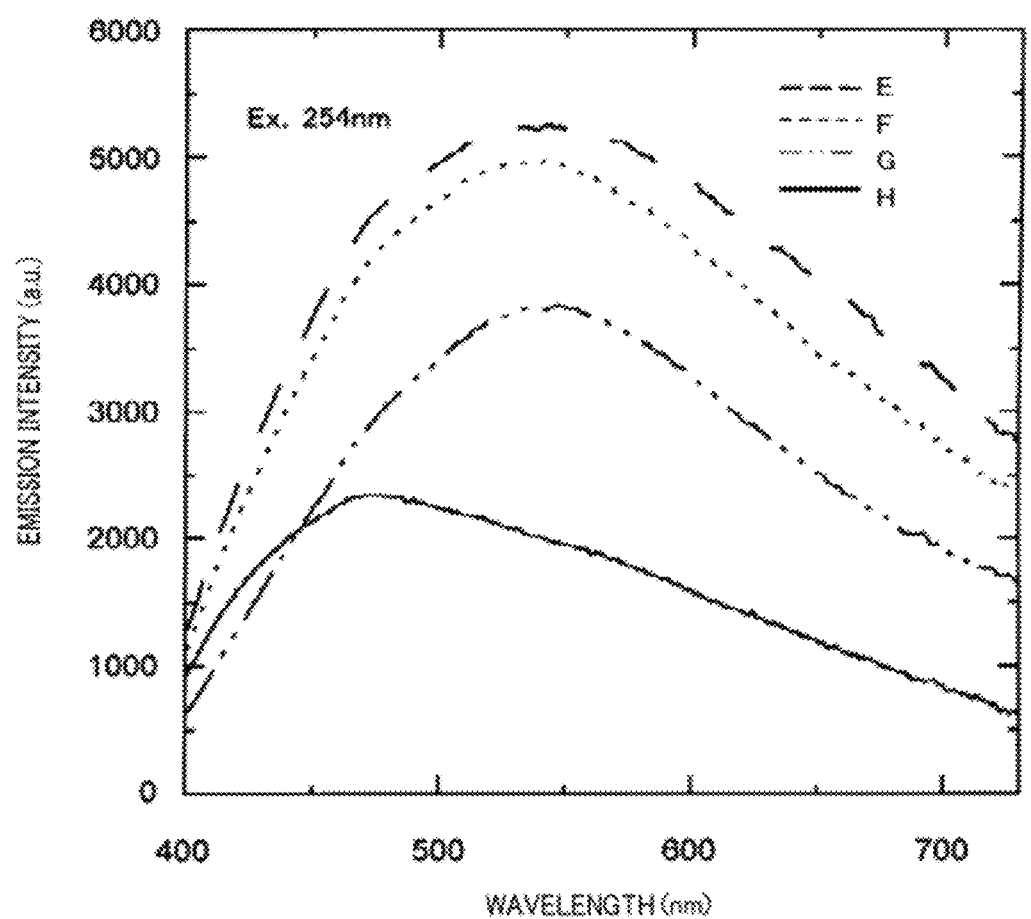
FIG. 26 is a graph showing fluorescence spectra under excitation by ultraviolet light of wavelength 254 nm in Evaluation (9).

Additionally, under the excitation of central wavelength 254 nm as shown in FIG. 26, similarly as those of 365 nm, broad emission over an entire region of visible light of 400 nm to 700 nm was wholly observed. Blue emission due to copper ion (Cu$^+$) could be confirmed, however, the peak top has sifted somewhat to the side of longer wavelength compared to that of the base glass composition of 6.6Na$_2$O-28.3B$_2$O$_3$-65.1SiO$_2$ mol % and slightly white-tinged blue emission was confirmed. The emission intensities became weaker as the content of Na$_2$O in the base glass increased (as the content of SiO$_2$ decreased) and were wholly stronger than that of the base glass composition of 6.6Na$_2$O-28.3B$_2$O$_3$-65.1SiO$_2$ mol %.

INDUSTRIAL APPLICABILITY

The present invention can be advantageously used as a technology to provide a novel fluorescent material which emits high-intensity light of a warm white color (yellow to orange) upon irradiation with near ultraviolet light, is exchangeable for incandescent lights or fluorescent lamps, and may comply with saving of energy and saving of rare resources.

The invention claimed is:

1. A light-emitting glass, comprising a borosilicate glass having a separated-phase structure composed of at least one of (i) to (iii) below as a base glass, wherein the base glass comprises a transition metal ion cluster containing at least one selected from the group consisting of copper (Cu), gold (Au), and silver (Ag) as a constituent metal;
   (i) alkali metal borosilicate glass having a separated-phase structure (R$_2$O—B$_2$O$_3$—SiO$_2$),
   (ii) alkaline earth metal borosilicate glass having a separated-phase structure (R'O—B$_2$O$_3$—SiO$_2$), and
   (iii) alkali metal-alkaline earth metal borosilicate glass having a separated-phase structure (R$_2$O—R'O—B$_2$O$_3$—SiO$_2$);
   in (i) to (iii), R represents an alkali metal and R' represents an alkaline earth metal, respectively,
   wherein the light-emitting glass comprises tin oxide (SnO) as a reducing agent in an amount of 0.5 to 10.0 mol % as outer percentage.

2. The light-emitting glass according to claim 1, wherein the transition metal ion cluster is a copper ion cluster (Cu$^+$ cluster), and the base glass is an alkali metal borosilicate glass having a separated-phase structure (R$_2$O—B$_2$O$_3$—SiO$_2$).

3. The light-emitting glass according to claim 2, wherein the alkali metal of the alkali metal borosilicate glass is sodium (Na).

4. A light-emitting device, comprising the light-emitting glass according to claim 3 and a light-emitting element as a light-emitting source.

5. The light-emitting device according to claim 4, wherein the light-emitting element is a light-emitting diode.

6. A light-emitting device, comprising the light-emitting glass according to claim 2 and a light-emitting element as a light-emitting source.

7. The light-emitting device according to claim 6, wherein the light-emitting element is a light-emitting diode.

8. A light-emitting device, comprising the light-emitting glass according to claim 1 and a light-emitting element as a light-emitting source.

9. The light-emitting device according to claim 8, wherein the light-emitting element is a light-emitting diode.

10. A process for producing the light-emitting glass according to claim 1, comprising:
    dry-mixing a raw material component containing a compound which corresponds to a borosilicate glass having a separated-phase structure composed of at least one of (i) to (iii) for forming a base glass and a compound containing a transition metal which corresponds to the transition metal ion cluster, and adding tin oxide (SnO) as a reducing agent in an amount of 0.5 to 10.0 mol % as outer percentage,
    followed by melting and quenching thereof.

11. The process for producing the light-emitting glass according to claim 10, wherein the melting temperature or heating temperature is 1200° C. to 1700° C. and the melting time is 0.5 to 2.0 hours.

12. A light-emitting glass, comprising a silicate glass having a separated-phase structure composed of at least one of (iv) to (vi) below as a base glass, wherein the base glass comprises a transition metal ion cluster containing at least one selected from the group consisting of copper (Cu), gold (Au), and silver (Ag) as a constituent metal;
    (iv) alkali metal silicate glass having a separated-phase structure (R$_2$O—SiO$_2$), (v) alkaline earth metal silicate glass having a separated-phase structure (R'O—SiO$_2$), and
(vi) alkali metal-alkaline earth metal silicate glass having a separated-phase structure (R$_2$O—R'O—SiO$_2$);
in (iv) to (vi), R represents an alkali metal and R' represents an alkaline earth metal, respectively,
wherein the light-emitting glass comprises tin oxide (SnO) as a reducing agent in an amount of 0.5 to 10.0 mol % as outer percentage.

13. A process for producing the light-emitting glass according to claim 12, comprising:
dry-mixing a raw material component containing a compound which corresponds to a silicate glass having a separated-phase structure composed of at least one of (iv) to (vi) for forming a base glass and a compound containing a transition metal which corresponds to the transition metal ion cluster, and adding tin oxide (SnO) as a reducing agent in an amount of 0.5 to 10.0 mol % as outer percentage,
followed by melting and quenching thereof.

14. The process for producing the light-emitting glass according to claim 13, wherein the melting temperature or heating temperature is 1200° C. to 1700° C. and the melting time is 0.5 to 2.0 hours.

15. A light-emitting device, comprising the light-emitting glass according to claim 12 and a light-emitting element as a light-emitting source.

16. The light-emitting device according to claim 15, wherein the light-emitting element is a light-emitting diode.

* * * * *